US007475895B2

(12) United States Patent
Stacey et al.

(10) Patent No.: US 7,475,895 B2
(45) Date of Patent: Jan. 13, 2009

(54) HYDRAULIC CIRCUIT FOR A STABILIZER BAR

(75) Inventors: Scott A. Stacey, Centerville, OH (US); Vincent G. Pichon, Blois (FR); Jason A. Mc Clelland, Xenia, OH (US); Mike W. Hilton, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 456 days.

(21) Appl. No.: 11/152,916

(22) Filed: Jun. 15, 2005

(65) Prior Publication Data

US 2005/0280237 A1    Dec. 22, 2005

Related U.S. Application Data

(60) Provisional application No. 60/643,722, filed on Jan. 13, 2005, provisional application No. 60/579,688, filed on Jun. 15, 2004.

(51) Int. Cl.
*B60G 11/26* (2006.01)
*B60G 11/30* (2006.01)

(52) U.S. Cl. .......................... 280/124.16; 280/124.161; 280/124.157

(58) Field of Classification Search ............ 280/124.16, 280/124.161, 124.157, 124.106, 124.107, 280/124.162
See application file for complete search history.

(56) References Cited

U.S. PATENT DOCUMENTS

| | | | | |
|---|---|---|---|---|
| 4,463,818 A | * | 8/1984 | Sonneborn | 180/89.15 |
| 4,493,386 A | * | 1/1985 | Sonneborn | 180/89.15 |
| 5,529,324 A | * | 6/1996 | Krawczyk et al. | 280/124.106 |
| 6,145,859 A | * | 11/2000 | Altherr et al. | 280/124.159 |
| 6,179,310 B1 | * | 1/2001 | Clare et al. | 280/124.159 |
| 6,206,383 B1 | * | 3/2001 | Burdock | 280/5.508 |
| 6,533,294 B1 | * | 3/2003 | Germain et al. | 280/5.511 |
| 6,575,484 B2 | * | 6/2003 | Rogala et al. | 280/124.158 |
| 6,820,877 B1 | * | 11/2004 | Ichimura et al. | 280/6.157 |
| 6,948,580 B2 | * | 9/2005 | Scholten et al. | 180/89.14 |
| 7,055,831 B2 | * | 6/2006 | Brandenburger | 280/5.504 |
| 7,055,832 B2 | * | 6/2006 | Germain | 280/5.508 |
| 7,104,548 B2 | * | 9/2006 | Ichimura et al. | 280/6.154 |
| 7,219,779 B2 | * | 5/2007 | Bauer et al. | 188/266 |
| 7,293,780 B2 | * | 11/2007 | Germain et al. | 280/5.506 |
| 2004/0245732 A1 | * | 12/2004 | Kotulla et al. | 280/5.502 |
| 2006/0237942 A1 | * | 10/2006 | Munday et al. | 280/124.157 |
| 2007/0170680 A1 | * | 7/2007 | Knaap | 280/124.106 |
| 2007/0235955 A1 | * | 10/2007 | Mizukoshi et al. | 280/5.511 |
| 2008/0100017 A1 | * | 5/2008 | Bitter | 280/124.16 |

* cited by examiner

*Primary Examiner*—John Q. Nguyen
*Assistant Examiner*—Karen Amores
(74) *Attorney, Agent, or Firm*—Thomas N. Twomey

(57) ABSTRACT

A hydraulic system for use in a motorized vehicle including a pressure source, a valve fluidly coupled to the pressure source, and an actuator fluidly coupled to the valve. The actuator includes an outer casing and a piston slidably received in the outer casing such that the piston defines a piston chamber and a rod chamber in the outer casing. The actuator includes a rod coupled to the piston on a side of the piston facing the rod chamber. The valve is configured such that when the valve is in an open position the valve provides fluid communication to the rod chamber and provides fluid communication to the piston chamber. Fluid flowing through the valve to the rod chamber passes through a restricted orifice having cross sectional area that is smaller than the cross sectional area of any orifice that would be passed through by fluid flowing through the valve to the piston chamber.

32 Claims, 17 Drawing Sheets

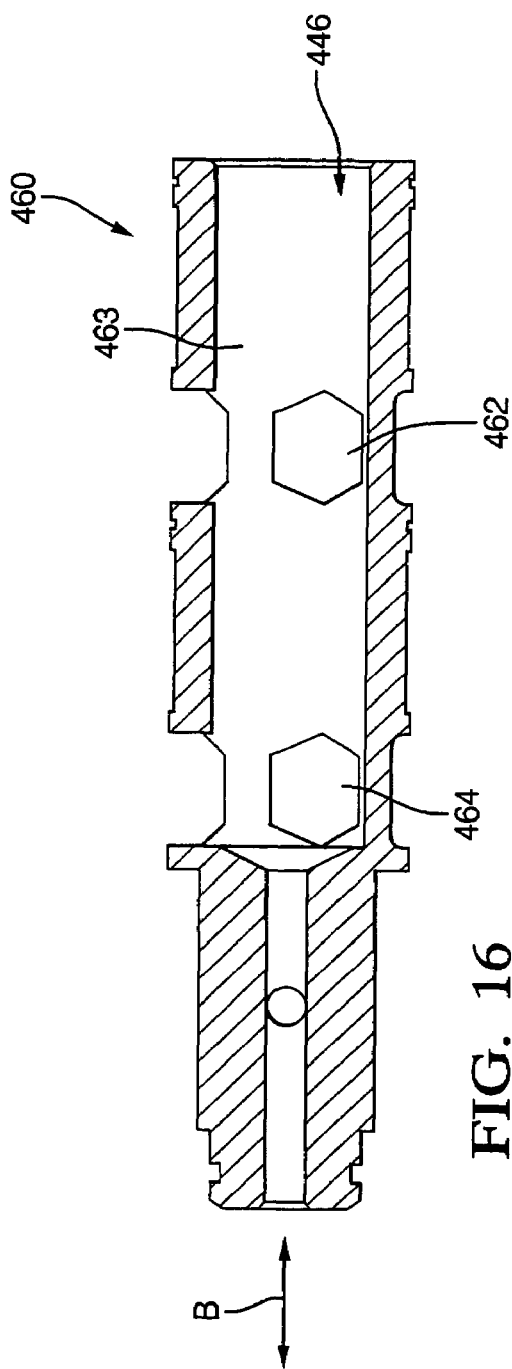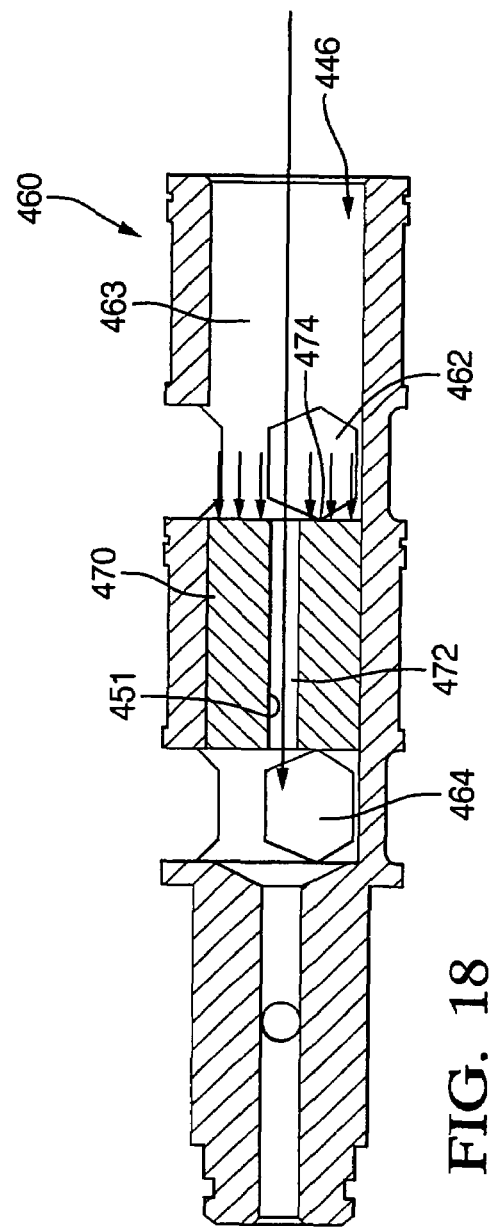
FIG. 16
FIG. 18

HYDRAULIC CIRCUIT FOR A STABILIZER BAR

This application claims priority to U.S. provisional patent application Ser. No. 60/579,688, filed Jun. 15, 2004, and U.S. provisional patent application Ser. No. 60/643,722, filed Jan. 13, 2005. The entire contents of both of these applications are hereby incorporated by reference.

BACKGROUND

Stabilizer bars (also known as anti-roll bars and/or sway bars) are often used in motorized vehicles to at least partially couple the wheels of a single axle together to ensure stability and to ensure sufficient contact of the wheels with the road surface during cornering. In particular, during a hard turn or cornering, the weight of the vehicle shifts to the outer wheels, and the inner wheels may tend to carry less weight (thereby reducing traction with the road surfaces) or even lift off of the road surface. Stabilizer bars serve as a semi-rigid coupling between the wheels of an axle to urge the inner wheels downwardly and into contact with the road surface.

Active stabilization bar systems utilize a hydraulic system to drive the stabilizer bar when the vehicle system senses that actuation of the stabilizer bar will improve the handling performance of the vehicle. Existing hydraulic systems may include piston-driven systems to operate/actuate the stabilizer bar.

One type of stabilizer bar system has actuators for operating/actuating the stabilizer bar at both the front and rear axles. Different controlled pressures are applied or present in the front and rear actuators, which allows variable balancing therebetween. By way of example, PCT international application PCT/EP03/03674, published as WO 03/093041 A1, describes embodiments of vehicle roll control stabilizer systems and serves to provide background information related to the present invention.

Referring to FIG. 1, a vehicle 10 is shown schematically and comprises a frame 11 and a pair of front wheels 12 each rotatably mounted on an axle 14, a pair of rear wheels 16 each rotatably mounted on an axle 18, and a shock absorbing system 20 associated with each wheel. A portion 22 of a vehicle roll control system in accordance with the prior art example is associated with the front wheels 12, and a portion 24 of the vehicle roll control system in accordance with the prior art example is associated with the rear wheels 16. The portions 22, 24 are substantially the same but with modifications made to allow fitting to the vehicle 10.

Referring in more detail to FIGS. 2 to 4, the portion 22 of the vehicle roll control system for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12 by a tie rod 43. The second arm 30 (FIG. 4) is rotatably mounted at one end 44 on the torsion bar 26 by way of a bearing 46. The other end 48 of the second arm 30 is connected to the axle 14 of the other front wheel 12 by a tie rod 49. The first and second arms 28, 30 extend substantially parallel to one another when the vehicle is stationary, and substantially perpendicular to the torsion bar 26.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The hydraulic actuator 34 (FIG. 4) extends between, and is connected to, the free end 54 of the lever arm 32 and the other end 48 of the second arm 30. The hydraulic actuator 34 comprises a housing or outer casing 56, which defines first and second fluid chambers 58, 60 separated by a piston 62, which makes a sealing sliding fit with the housing 56. As shown in FIG. 4, the housing 56 is connected to the other end 48 of the second arm 30, and the piston 62 is connected to the free end 54 of the lever arm 32 by a piston rod 64, which extends through the second fluid chamber (or rod chamber) 60 and is coupled to the piston 62. It will be appreciated that these connections may be reversed. The fluid chambers 58, 60 contain hydraulic fluid and are fluidly connected to fluid lines 66, 68 respectively.

When the piston 62 is moved due to hydraulic forces, the force is transmitted to the rod 64 and lever arm 32. Because the lever arm 32 is rotationally coupled to the torsion bar 26, movement of the piston 62 induces torsion or twisting in the torsion bar 26. The torsion of the torsion bar 26 moves the arms 28, 30 in opposite directions to thereby move the wheels 12 connected thereto in opposite vertical directions. In this manner, the actuator 34 can be operated to provide active stabilization bar control. The portion 24 of the vehicle roll control for the rear of the vehicle is substantially the same as the front portion 22 described above, but with the components (which are shown with prime markings in FIGS. 1 and 2) having a corresponding but different layout.

The hydraulic and electrical control circuit of the vehicle roll control system is shown in FIGS. 5 and 6. The hydraulic circuit includes a fluid pump 80, a fluid reservoir 82, a direction control valve (DCV) 84, a first pressure control valve (PCV-1) 86, and a second pressure control valve (PCV-2) 88. The first pressure control valve 86 has an input fluidly connected to the output of the pump 80 and an output fluidly connected to the input to the second pressure control valve 88. The second pressure control valve 88 has an output fluidly connected to the input to the reservoir 82.

Both of the pressure control valves 86, 88 normally reside in their open position in which fluid flows therethrough. The pressure control valves 86, 88 may both be variable valves in that they can be moved to various partially closed or partially open positions.

The direction control valve 84 has a first port 90 fluidly connected to the output of pump 80; a second port 92 fluidly connected to fluid line 87 connecting the first and second pressure control valves 86, 88; a third port 94 fluidly connected to the fluid line 66 and the first fluid chamber (or piston chamber) 58 of each hydraulic actuator 34, 34'; and a fourth port 96 fluidly connected to the fluid line 68 and the second fluid chamber 60 (or rod chamber) of each hydraulic actuator. The direction control valve 84 is solenoid actuated, and has a closed or de-energized state (FIG. 5) in which the first and second ports 90, 92 are fluidly connected, and the third and fourth ports 94, 96 are isolated from one another and from the other ports, and an energized, actuated or open state (FIG. 6) in which the first port 90 is fluidly connected with the fourth port 96, and in which the second port 92 is fluidly connected with the third port 94.

The pump 80 may be driven by the vehicle engine and hence continuously actuated. Alternatively, the pump 80 may be driven by an electric motor or any other suitable means, either continuously, or variably. The piston or pressure control valves 86, 88 are actuated to adjust the fluid pressure in the hydraulic system between a predetermined minimum pressure and a predetermined maximum pressure, and to adjust the pressure differential between the first and second chambers 58, 60 of each hydraulic actuator 34, 34' (when the direction control valve 84 is actuated).

The electrical control circuit includes an electronic and/or computerized control module 70. The controller, ECU or control module 70 operates the fluid pump 80, the direction control valve 84, and the pressure control valves 86, 88, when required. The control module 70 actuates the valves 84, 86, 88 dependent on predetermined vehicle conditions which are determined by signals from one or more sensors, such as a pressure sensor 76 (which detects the presence of fluid pressure in the hydraulic circuit), a pressure sensor 77 (which detects the fluid pressure in line 87), a lateral g sensor 74 (which monitors the sideways acceleration of the vehicle), a steering sensor 72 (which monitors the steering angle of the front wheels 12), a vehicle speed sensor 78, and/or any other relevant parameter.

If the control module 70 detects that roll control is required (due, for example, to cornering of the motor vehicle 10), the control module may determine that the module has to generate a force F which acts on the piston rod 64 to extend the actuators 34, 34' (i.e., to move the pistons 62 up in FIGS. 5 and 6), or to compress the actuators (i.e., move the pistons 62 down in FIGS. 5 and 6), in an axial direction. In particular, when it is desired to move the actuators in compression, pressure control valve 86 is closed (or partially closed) while the pressure control valve 88 and direction control valve 84 are open. In this manner, pressurized fluid flows into the chambers 60 via ports 90, 96 and via line 68. At the same time no (or very little) pressurized fluid flows into the chambers 58. The pressure differential causes the piston rods 64 to move in compression.

In this manner, a pressure which correlates with the force F can be generated and the pressure differential between the first and second chambers 58, 60 varies as the fluid pressure in the second chamber 60 increases or decreases. In other words, assuming no road inputs, the differential pressure between the first chambers 58 and second chambers 60 varies with the position of the piston 62.

For extension, the control module 70 actuates the pressure control valves 86, 88 to provide a predetermined (i.e., equal) fluid pressure in each of the first and second fluid chambers 58, 60, which correlates with the force F, and sets the direction control valve 84 in the actuated position as shown in FIG. 6. In particular, in order to pressurize both of the chamber 58, 60, pressure control valve 88 is closed (or partially closed) while pressure control valve 86 and direction control valve 84 are open. In this manner, pressurized fluid flows into both the chambers 58, 60 via ports 90, 92, 94, 96, and via lines 66, 68. Due to the presence of the piston rods 64, the surface area of the pistons 62 facing the second chambers 60 is less than the surface area of the pistons facing the first chambers 58. Accordingly, when fluid of equal pressure is located in the first and second chambers 58, 60, the pistons 68 move upwardly in extension.

In this case, the pressure differential between the first and second chambers 58, 60 is maintained substantially constant as the level of the fluid pressure increases or decreases as required. In other words, assuming no road inputs, the differential pressure between the first chambers 58 and second chambers 60 remains constant, regardless of the position of the piston 62. When the actuators 34, 34' are moved in either extension or compression, one of the wheels 12, 16 on an axle 14, 18 is moved upwardly and the other wheel 12, 16 on that same axle 14, 18 is moved downwardly.

A graph illustrating the fluid pressure in the first and second chambers 58, 60 when the actuator 34, 34' is subjected to a compression force or an extension force is shown in FIG. 14.

In this case, the pressurized fluid provided to the chambers 58, 60 is shown as the vertical axis, and the force output by the actuator 34 is shown on the horizontal axis. When the actuator 34 is moved in compression, pressurized fluid is fed to the rod chambers 60, and no pressure or little pressure is present in the piston chambers 58. As the differential pressure is increased (i.e. as one moves to the left side of the graph of FIG. 14) the net output force of the actuator 34 is correspondingly increased.

On the other hand, when the actuator 34 is moved in extension, pressurized fluid of equal pressure is provided in both the rod chamber 60 and piston chamber 58 (the pressure lines for chambers 58, 60 in FIG. 14 are slightly spaced apart for illustrative purposes and to accommodate tolerances in the system). Due to the greater surface area of the piston 62 facing the piston chamber 58, the pressure in chamber 58 acts upon a greater surface area than the pressure in chamber 60, and the actuator 34 is moved in extension.

If the control module 70 detects, for example, that the vehicle is traveling in a straight line and no stabilization bar activation is required, the control module 70 actuates the pressure control valves 86, 88 and the direction control valve 84, and provides small amounts of fluid pressure in the first and second chambers 58, 60 such that the actuators 34, 34' neither extend nor compress in the axial direction. For example, in this case the DCV valve 84 is open, as are the pressure control valves 86, 88 such that fluid flows freely through the system and does not cause extension or compression of the actuators 34, 34'.

By suitable dimensions for the actuators 34, 34', the output force from the actuators can be made substantially the same irrespective of the direction of motion of the piston 62. More particularly, the surface area on the side of the pistons 62 facing the rod chambers 60 may be one-half of the surface are of the opposite side of the piston (i.e., the side facing the piston chambers 58). In this manner, if fluid of a predetermined pressure is supplied in both the rod chambers 60 and piston chambers 58, the pistons 62 are moved in extension with a force F. On the other hand, if fluid of the same predetermined pressure is supplied in only the rod chambers 60 then the pistons 62 are moved in compression with the same force F. Thus the particular surfaces areas on the two faces of the pistons 62 help to ensure that the actuators 34, 34' provide a consistent output force for a given pressure.

In the failure mode, or during certain diagnostics, the direction control valve 84 is de-energized (as shown in FIG. 5) such that the hydraulic actuators 34, 34' are locked. Fluid can freely flow within the hydraulic system between the pump 80 and the reservoir 82 by way of the first and second ports 90, 92 of the direction control valve 84, and the second pressure control valve 88 (which may include a pressure relief valve). As the third and fourth ports 94, 96 of the direction control valve 84 are closed and isolated, the actuators 34, 34' are effectively locked since no fluid can flow into or out of the actuator systems.

FIG. 7 shows a first alternative arrangement for the hydraulic circuit in which (in comparison to FIGS. 5 and 6) like parts have been given the same reference numeral. In this first alternative, the direction control valve 84' has a fifth port 97 fluidly connected to the input of the fluid reservoir 82. In the de-energized state of the direction control valve 84', the first, second and fifth ports 90, 92, 97 are fluidly connected with each other and to the fluid reservoir 82. In the energized or actuated state of the direction control valve 84', the fifth port 97 is fluidly isolated from the other ports 90, 92, 94, 96 such that in this mode the system of FIG. 7 operates in generally the same manner as the system of FIGS. 5 and 6.

The presence of the fifth port 97 removes the need for actuation of the second pressure control valve 88 (when the direction control valve 84' is de-energized), or the presence of a pressure relief for the second pressure control valve. In particular, when the direction control valve 84' is energized, port 97 provides a direct connection to the reservoir and bypasses the valves 86, 88. Other features and operation of this first alternative hydraulic circuit in a vehicle roll control system are as described above with respect to FIGS. 1 to 6, and 14.

FIG. 8 shows a second alternative arrangement for the hydraulic circuit in which (in comparison to FIGS. 5 and 6) like parts have been given the same reference numeral. In this second alternative, the direction control valve 84 has been split into two parts, a first part 84a (DCV-1) and a second part 84b (DCV-2). The two parts 84a, 84b of the direction valve 84 are actuated separately, but in unison. The first part 84a of the direction control valve 84 incorporates the first port 90, and the fourth port 96 which is fluidly connected with the second fluid chambers 60 of the hydraulic actuators 34, 34'. The second part 84b of the direction control valve 84 incorporates the second port 92, and the third port 94 which is fluidly connected with the first fluid chambers 58 of the hydraulic actuators 34, 34'.

The first part 84a of the direction control valve 84 has an additional port 92' which is fluidly connected with the second port 92 of the second part 84b. The second part 84b of the direction control valve 84 has an additional port 97 which is fluidly connected with the input of the fluid reservoir 82. In the de-energized state of the first and second parts 84a, 84b of the direction control valve 84, the first port 90 is fluidly connected with the fluid reservoir 82 by way of ports 92', 92 and 97 as shown in FIG. 8. In the energized state of the first and second parts 84a, 84b of the direction control valve 84, the ports 92' and 97 are fluidly isolated from the other ports in the same part. The presence of the ports 92', 97 removes the need for actuation of the second pressure control valve 88 (when the direction control valve 84 is de-energized), or the presence of a pressure relief for the second pressure control valve, particularly when the first and second parts 84a, 84b of the direction control valve are de-energized.

The system of FIG. 8 allows for a zero-net-force condition in the actuators 34, 34', due to the dual nature of the first and second parts 84a, 84b of the direction control valve. For example, a greater pressure can be applied in the rod chambers 60 than the piston chambers 58. Due to the differing surface area on the two sides of the pistons 62, the pressure differential can be selected to provide a net force of zero upon the pistons 62. This allows the system to continue to push fluid through the actuators 34 without causing extension or compression. Other features and operation of this second alternative hydraulic circuit in a vehicle roll control system are as described above with respect to FIGS. 1 to 6, and 14.

In the prior art example, the direction control valve 84, 84', 84a and 84b is energized when roll control is required, irrespective of the direction of turn of the vehicle 10. The fluid pressure in the first and second fluid chambers 58, 60 of the hydraulic actuators 34, 34' is controlled by the selective actuation of one of the first and second pressure control valves 86, 88. By adjusting the actuation of the first and second pressure control valves 86, 88, the hydraulic actuators 34, 34' are actuated for compression or extension dependent on the direction of turn of the vehicle 10. Consequently, the roll control system controls vehicle roll during a change in the direction of turn of the vehicle by adjusting the operation of the first and second pressure control valves 86, 88. Such an arrangement provides a smooth transition between left and right turns.

The hydraulic system is also applicable for use with a vehicle roll control system, the front portion 122 of which is as shown in FIG. 9 and the rear portion of which is substantially identical to the front portion. In this embodiment in accordance with the prior art example, the front portion 122 comprises a torsion bar 126, a first arm 128, and a hydraulic actuator 134. The first arm 128 is fixed at one end 138 to one end 140 of the torsion bar 126. The other end 142 of the first arm 128 is connected to one of the McPherson struts 120 (commonly referred to as struts). The hydraulic actuator 134 has a piston rod 164, which is fixed to the other end 187 of the torsion bar 126. The housing or outer casing 156 of the actuator 134 is connected to the other strut 120. The hydraulic actuator 134 is substantially the same as the actuator 34 described above with reference to FIGS. 1 to 6, and has a fluid line 166 connected to a first fluid chamber inside the housing, and another fluid line 168 connected to a second fluid chamber inside the housing. The first and second fluid chambers inside the housing 156 are separated by a piston secured to the piston rod 164. The fluid lines 166, 168 for each hydraulic actuator 134 are connected to a hydraulic circuit as shown in FIGS. 5 and 6, which is controlled by a control circuit as shown in FIGS. 5 and 6, or any one of the arrangements shown in FIGS. 7 and 8. The roll control system is operated in substantially the same manner as that described above with reference to FIGS. 1 to 6, and 14, or either one of FIGS. 7 and 8.

The hydraulic system is also applicable for use with a vehicle roll control system as shown in FIG. 10. In this embodiment, the system 222 comprises a torsion bar 226, a first arm 228, a second arm 228', and a hydraulic actuator 234. The first arm 228 is fixed at one end 238 to one end 240 of the torsion bar 226. The other end 242 of the first arm 228 is connected to one of the shock absorbers 220. The second arm 228' is fixed at one end 238' to the other end 287 of the torsion bar 226. The other end 242' of the second arm 228' is connected to the other shock absorber 220'. The torsion bar 226 is split into first and second parts 290, 292, respectively. The first and second parts 290, 292 of the torsion bar 226 have portions 294, 296, respectively, which are axially aligned. The axially aligned portions 294, 296 are connected by a hydraulic actuator 234.

The hydraulic actuator 234, as shown in FIG. 11, comprises a cylindrical housing 256 or outer casing, which is connected at one end 239 to the portion 294 of the first part 290 of the torsion bar 226. The actuator 234 further comprises a rod 241 positioned inside the housing 256, extending out of the other end 243 of the housing, and connectable to the portion 296 of the second part 292 of the torsion bar 226. The rod 241 has an external screw thread 249 adjacent the housing 256. Balls 251 are rotatably positioned in hemispherical indentations 253 in the inner surface 255 of the housing 256 adjacent the screw thread 249. The balls 251 extend into the screw thread 249. The rod 241 is slidably and rotatably mounted in the housing 256 at the other end 243 by way of a bearing 259 positioned in the other end 243. This arrangement allows the rod 241 to rotate about its longitudinal axis relative to the housing 256, and to slide in an axial direction A relative to the housing. A piston chamber 261 is defined inside the housing 256. The rod 241 sealingly extends into the piston chamber 261 to define a piston rod 264, and a piston 262 is secured to the end of the piston rod inside the piston chamber. The piston 262 makes a sealing sliding fit with the housing 256 and divides the chamber 261 into a first fluid chamber 258 and a second fluid chamber 260. The first fluid chamber 258 is fluidly connected to fluid line 266, and the second fluid chamber 260 is fluidly connected to fluid line 268.

The fluid lines 266, 268 are connected to a hydraulic circuit as shown in FIGS. 5 and 6, which is controlled by a control circuit as shown in FIGS. 5 and 6, or any one of the arrangements shown in FIGS. 7 and 8. The roll control system 222 is operated in substantially the same manner as that described above with reference to FIGS. 1 to 6, and 14, or any one of FIGS. 7 and 8.

An alternative arrangement for the hydraulic actuator of FIG. 11 is shown in FIG. 12. In this alternative embodiment, the actuator 334 comprises a cylindrical housing 356, which is connected at one end 339 to the portion 294 of the first part 290 of the torsion bar 226. The actuator 334 further comprises a rod 341 positioned inside the housing 356, extending out of the other end 343 of the housing, and connectable to the portion 296 of the second part 292 of the torsion bar 226. The rod 341 has an external screw thread 349 adjacent the housing 356. Balls 351 are rotatably positioned in hemispherical indentations 353 in the inner surface 355 of the housing 356 adjacent the screw thread 349. The balls 351 extend into the screw thread 349. The rod 341 is slidably and rotatably mounted in the housing 356 at the other end 343 of the housing by way of a bearing 359 positioned in the other end. The rod 341 makes a sliding guiding fit with the inner surface 355 of the housing 356 at its end 341' remote from the second part 292 of the torsion bar 226. This arrangement allows the rod 341 to rotate about its longitudinal axis relative to the housing 356, and to slide in an axial direction A relative to the housing.

First and second fluid chambers 358, 360 are defined inside the housing 356. The rod 341 makes a sealing fit with the inner surface 355 of the housing 356 by way of seal 371 to define a piston 362. The first fluid chamber 358 is positioned on one side of the piston 362, and the second fluid chamber 360 is positioned on the other side of the piston. A seal 369 is positioned adjacent the bearing 359. A portion 364 of the rod 341 defines a piston rod, which extends through the second fluid chamber 360. The first fluid chamber 358 is fluidly connected to fluid line 366, and the second fluid chamber 360 is fluidly connected to fluid line 368. The fluid lines 366, 368 are fluidly connected with one of the hydraulic circuits shown in FIGS. 5 to 8 to actuate the actuator 334.

A further alternative arrangement of hydraulic actuator 334' is shown in FIG. 13. In this further alternative embodiment, the actuator 334' is substantially the same as the actuator 334 shown in FIG. 12, but without the sliding guiding fit of the free end 341' of the rod 341 with the housing 356.

As outlined above, in one arrangement the cross-sectional area of the first fluid chamber of each hydraulic actuator described above is substantially double the cross-sectional area of the piston rod of the hydraulic actuator, when considered on a radial basis. Such an arrangement provides the same output force from the hydraulic actuator in either direction, using the same fluid pressure and equal amounts of fluid.

In the arrangement described above or below, a hydraulic actuator is provided for both the front of the vehicle and the rear of the vehicle, and these hydraulic actuators are controlled in unison. It will be appreciated that the hydraulic actuators may be controlled individually, and in certain cases the portion of the roll control system at the rear of the vehicle may be omitted. Also, the hydraulic actuator for the front of the vehicle may be a different type than the hydraulic actuator for the rear of the vehicle.

In any of the roll control systems described above or below, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

When the stabilizer bar is driven or displaced due to external inputs (i.e., a pothole in the road or the like) under normal operating conditions, the movement of the stabilizer bar can, in some cases, cause rapid motion of the pistons in the hydraulic circuit. This rapid movement of the pistons (movement in extension) can cause cavitation in the hydraulic fluid, which results in undesirable performance. Accordingly, there is a need for improved hydraulic circuit for use with a stabilizer bar system.

SUMMARY

In one embodiment, the present invention is a hydraulic circuit for use with a stabilizer bar system which restricts flow to the rod chamber to thereby reduce cavitation. In particular, in one embodiment the invention is a hydraulic system for use in a motorized vehicle including a pressure source, a valve fluidly coupled to the pressure source, and an actuator fluidly coupled to the valve. The actuator includes an outer casing and a piston slidably received in the outer casing such that the piston defines a piston chamber and a rod chamber in the outer casing. The actuator includes a rod coupled to the piston on a side of the piston facing the rod chamber. The valve is configured such that when the valve is in an open position the valve provides fluid communication to the rod chamber and provides fluid communication to the piston chamber. Fluid flowing through the valve to the rod chamber passes through a restricted orifice having cross sectional area that is smaller than the cross sectional area of any orifice that would be passed through by fluid flowing through the valve to the piston chamber.

BRIEF DESCRIPTION OF THE DRAWINGS

FIG. 15 is a schematic representation of a hydraulic circuit for use with a vehicle roll control system or the like;

FIG. 16 is a side cross sectional view of a spool used in one of the direction control valves of the hydraulic circuit of FIG. 15;

FIG. 18 is a side cross section of a spool for use in one of the direction control valves of FIG. 17;

DETAILED DESCRIPTION

Figure 1:
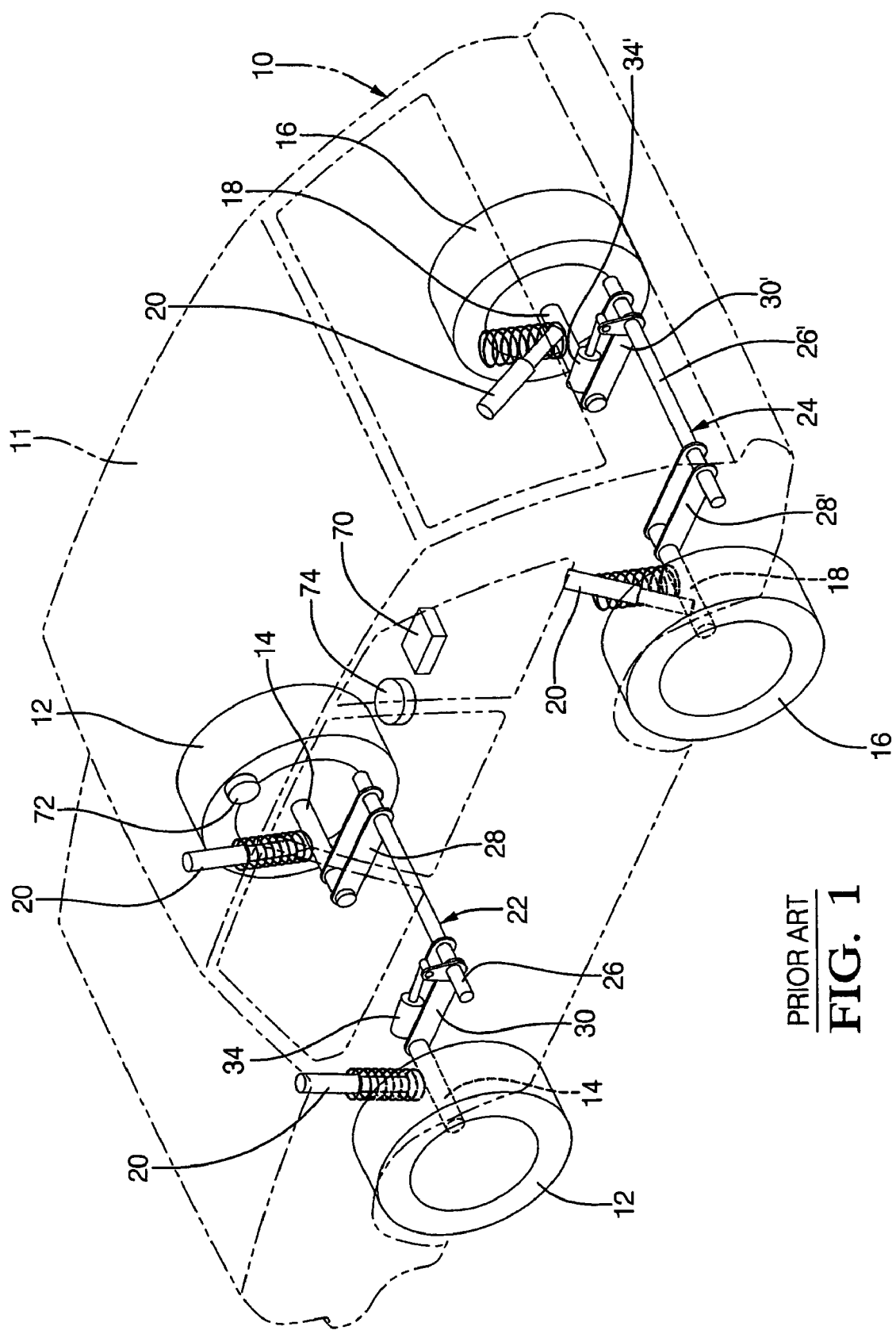
FIG. 1 is a schematic representation of a vehicle incorporating a vehicle roll control system.
Figure 2:
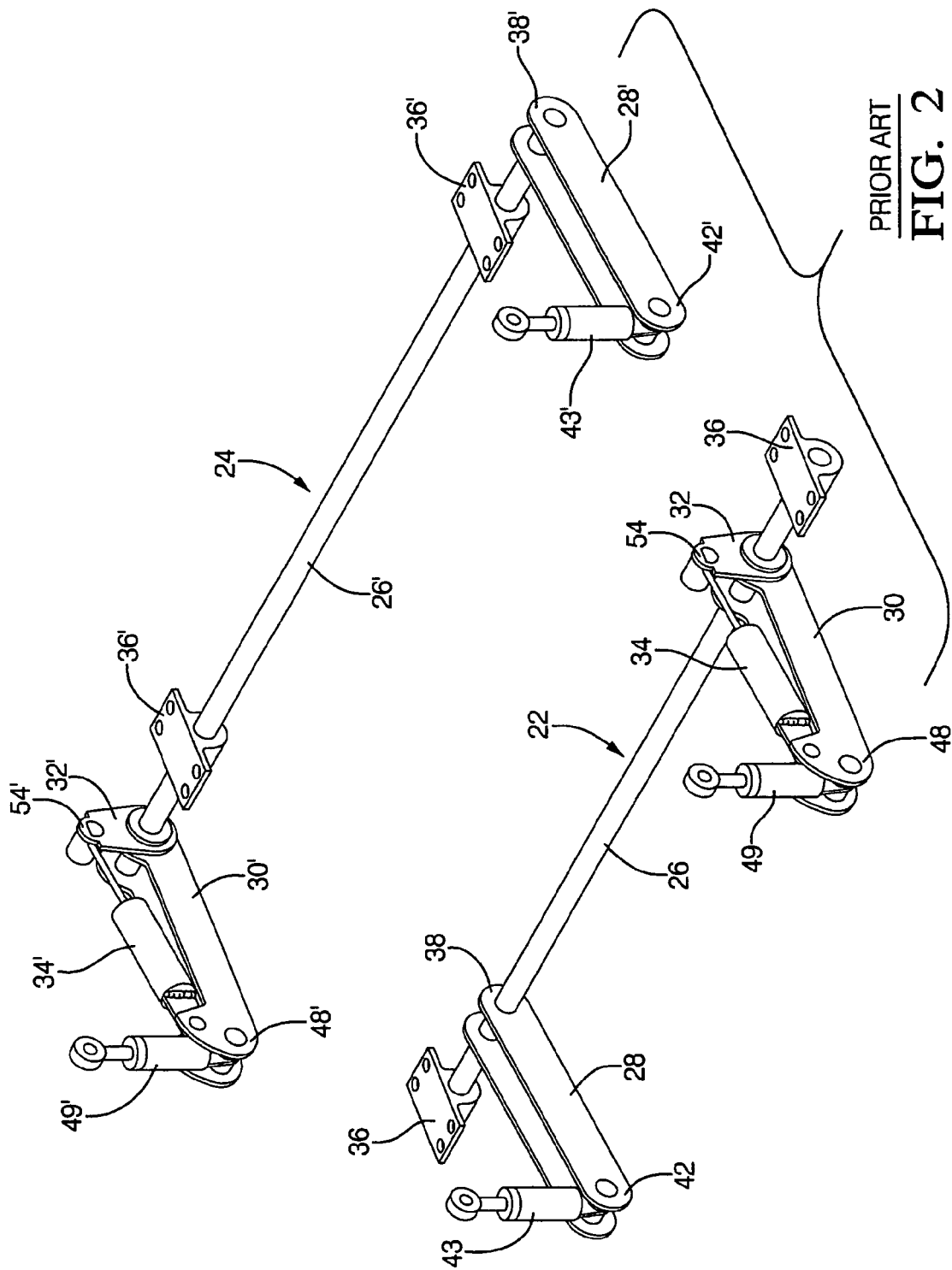
FIG. 2 is an enlarged detail view of the front and rear portions of the vehicle roll control system shown in FIG. 1.
Figure 3:
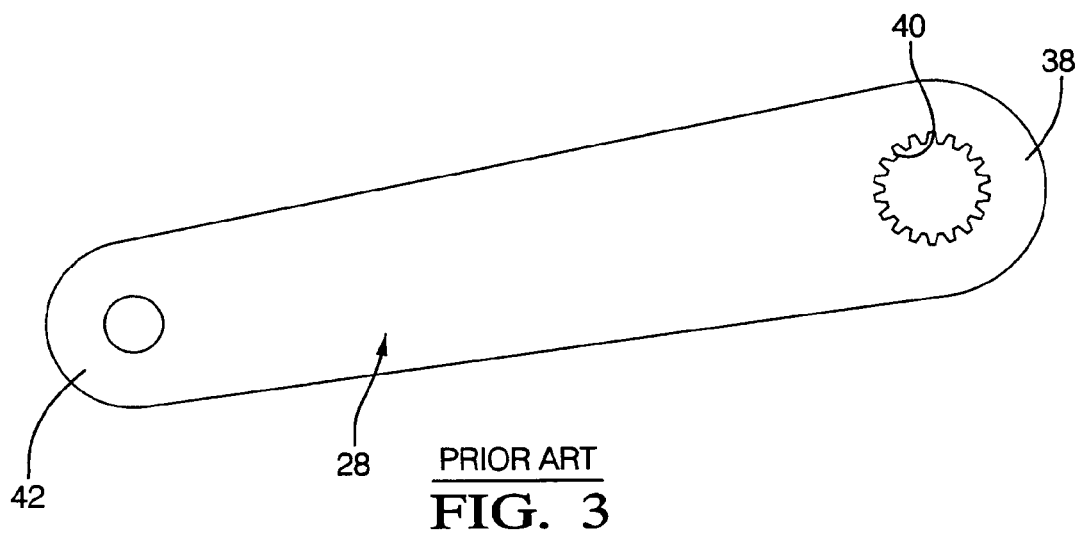
FIG. 3 is a side view of the first arm of the vehicle roll control system shown in FIG. 2.
Figure 4:
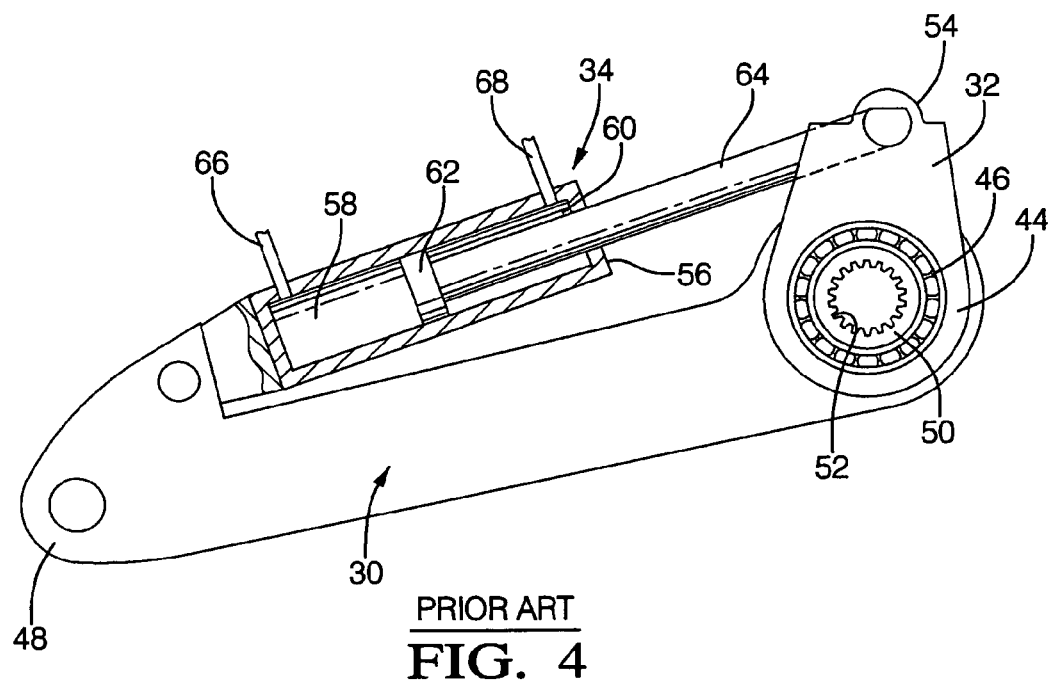
FIG. 4 is a side view of the second arm, hydraulic actuator (shown in cross-section) and lever arm of the vehicle roll control system shown in FIG. 2.
Figure 5:
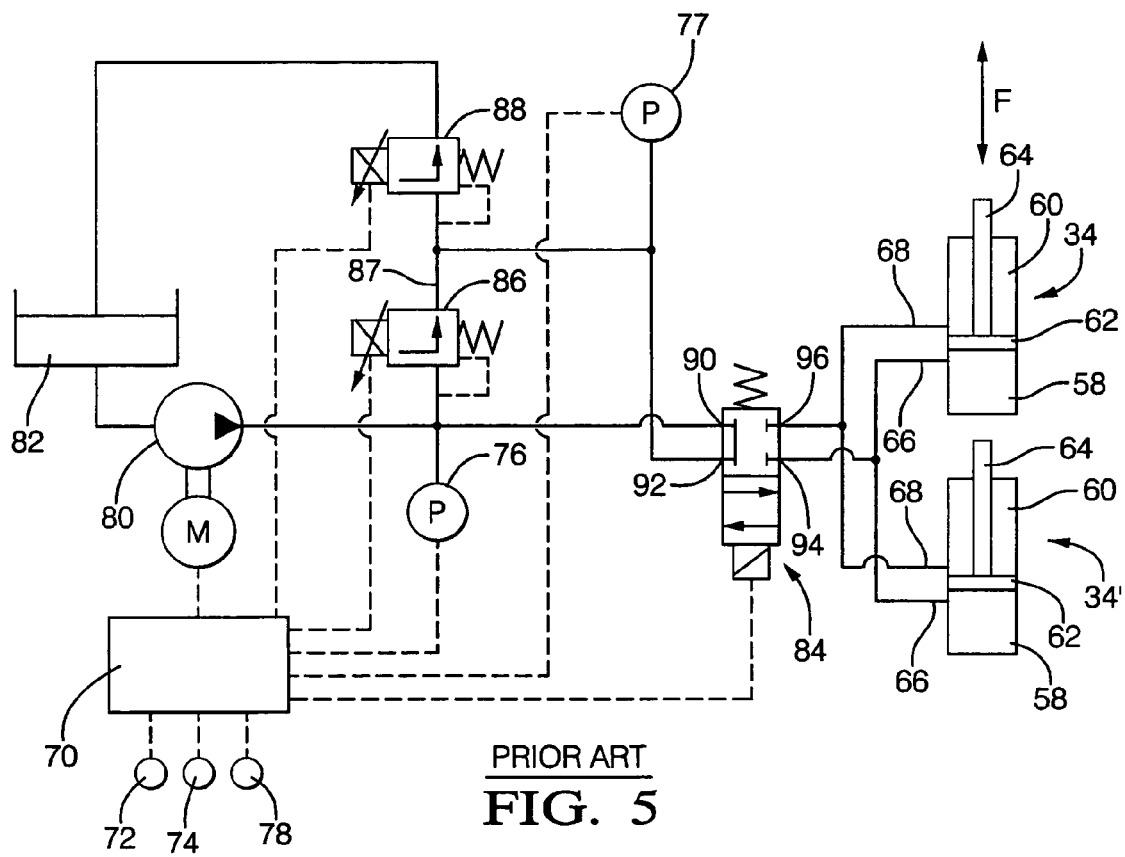
FIG. 5 is a schematic diagram of a hydraulic and electrical control circuit for use in the vehicle roll control system shown in FIG. 1, wherein the direction control valve is de-energized.
Figure 6:
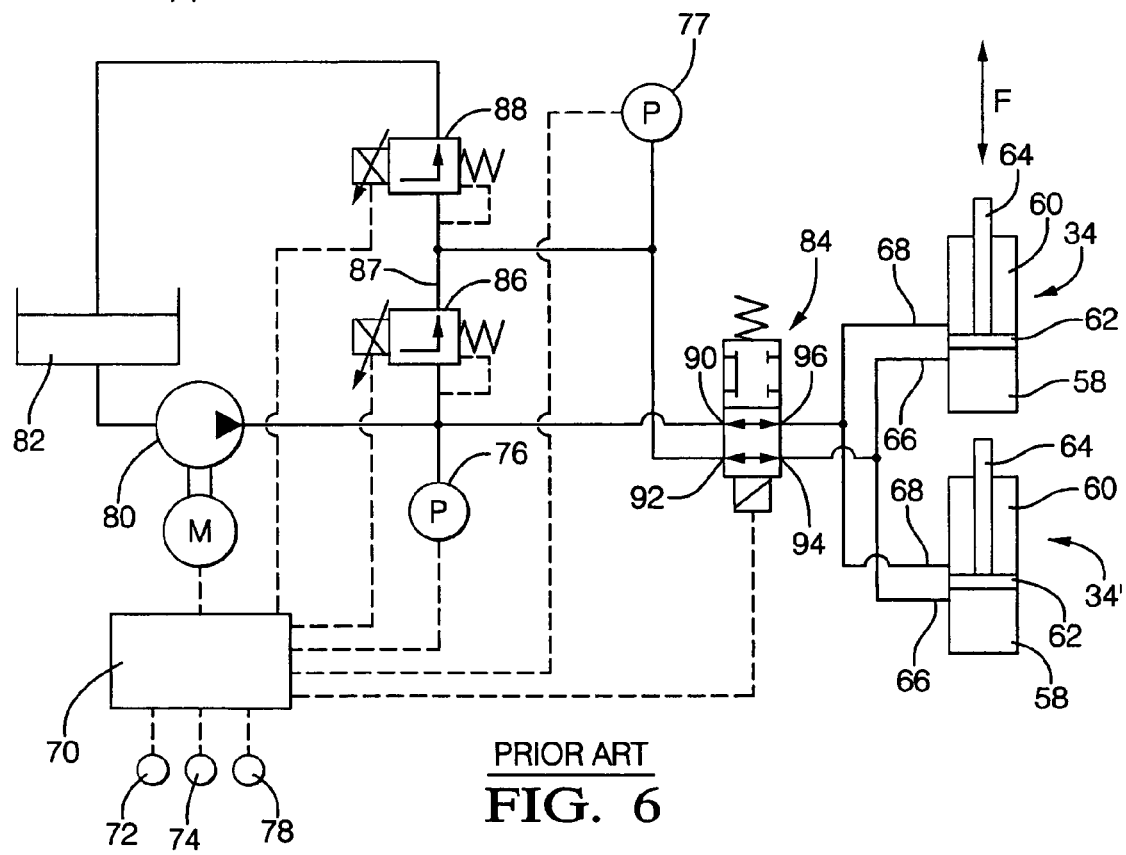
FIG. 6 is a schematic diagram of the hydraulic and electrical control circuit of FIG. 5, wherein the direction control valve is energized.
Figure 7:
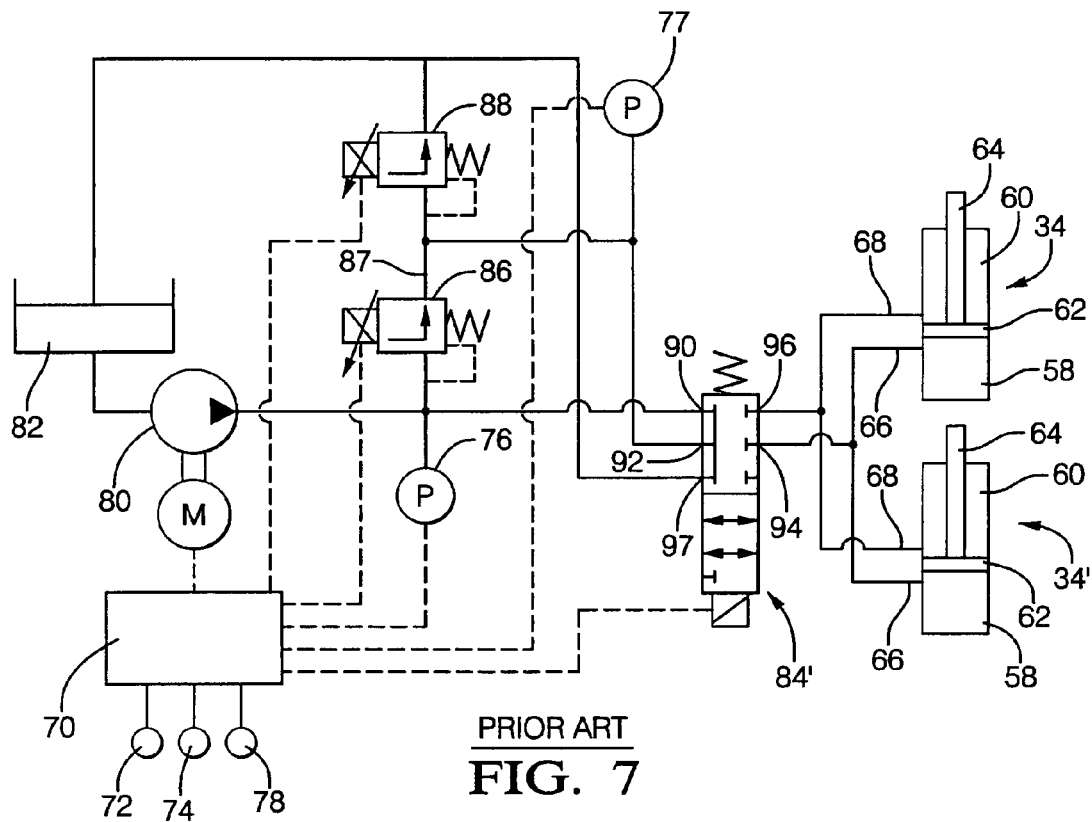
FIG. 7 is a schematic diagram of a first alternative arrangement for the hydraulic circuit of a vehicle roll control system, wherein the direction control valve is de-energized.
Figure 8:
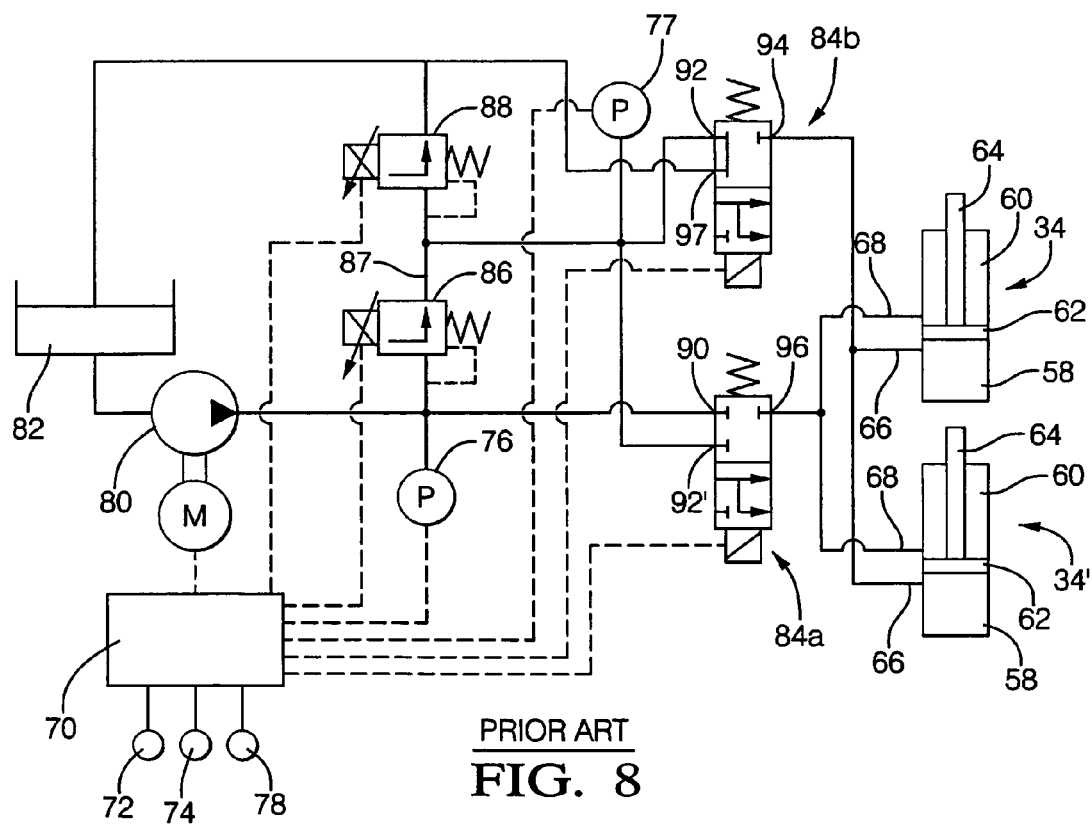
FIG. 8 is a schematic diagram of a second alternative arrangement for the hydraulic circuit of a vehicle roll control system, wherein the direction control valves are de-energized.
Figure 9:
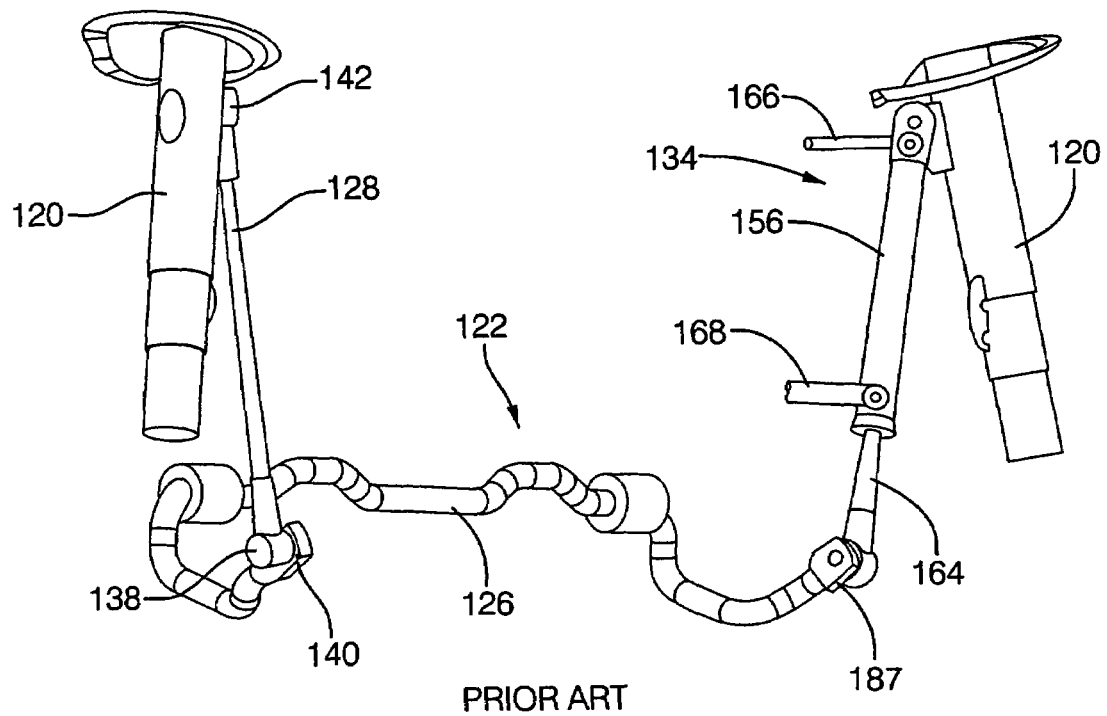
FIG. 9 is a view of a portion of a vehicle roll control system.
Figure 10:
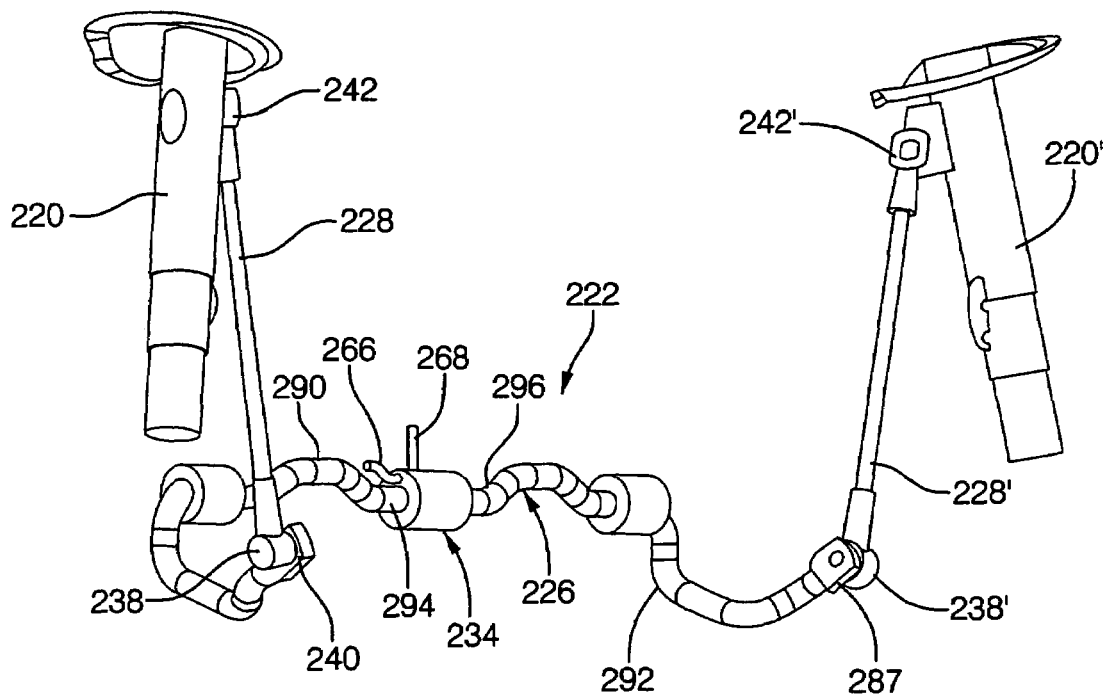
FIG. 10 is a view of another vehicle roll control system.
Figure 11:
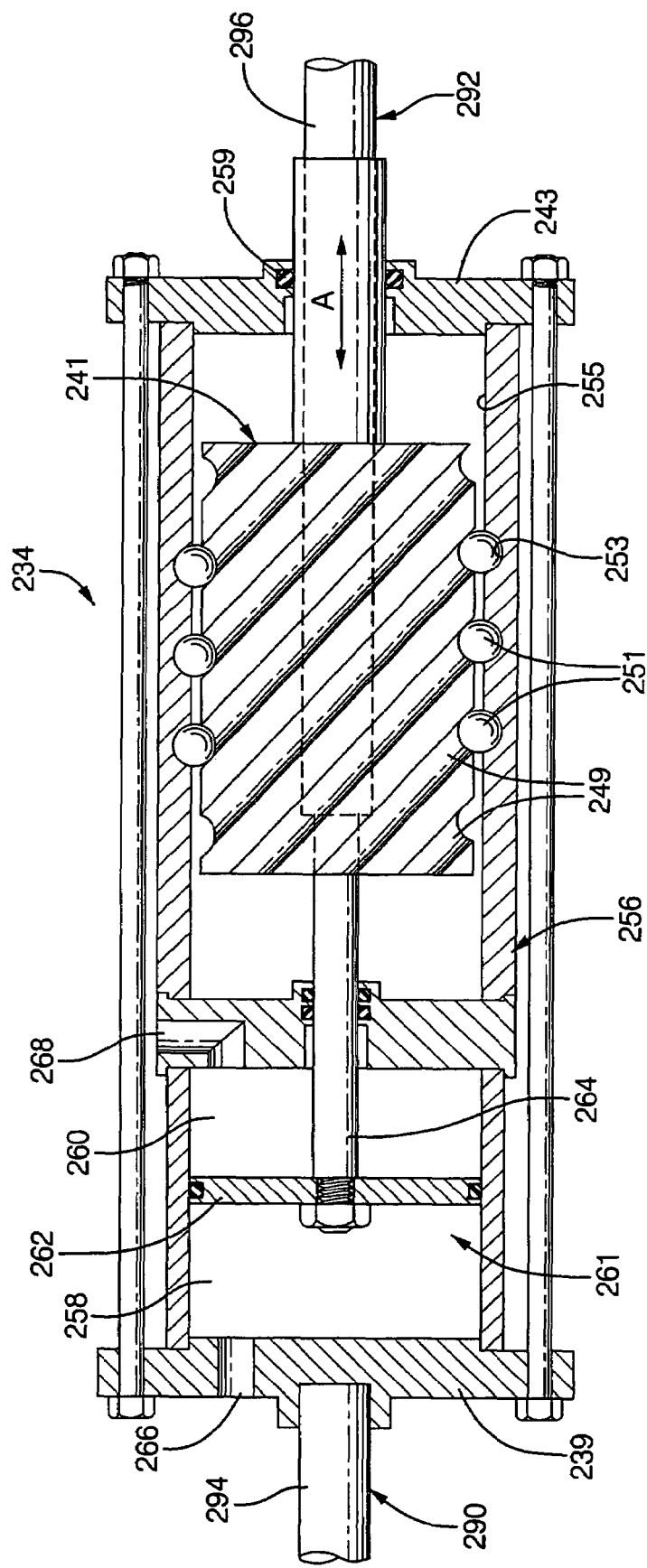
FIG. 11 is a cross-section view of the hydraulic actuator of the vehicle roll control system of FIG. 10.
Figure 12:
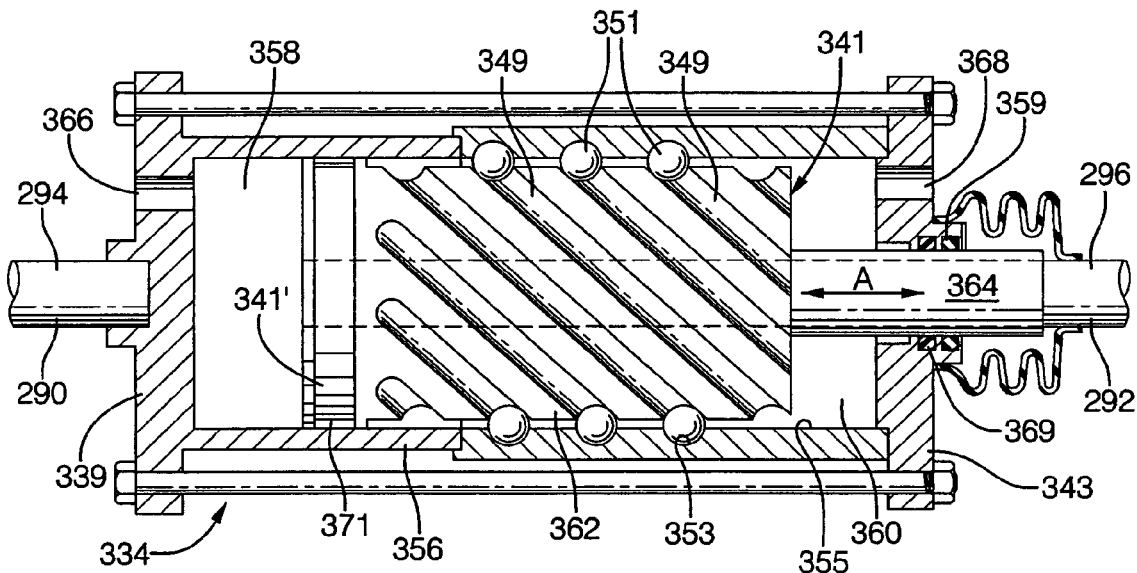
FIG. 12 is a cross-sectional view of an alternative embodiment of hydraulic actuator for the vehicle roll control system of FIG. 10.
Figure 13:
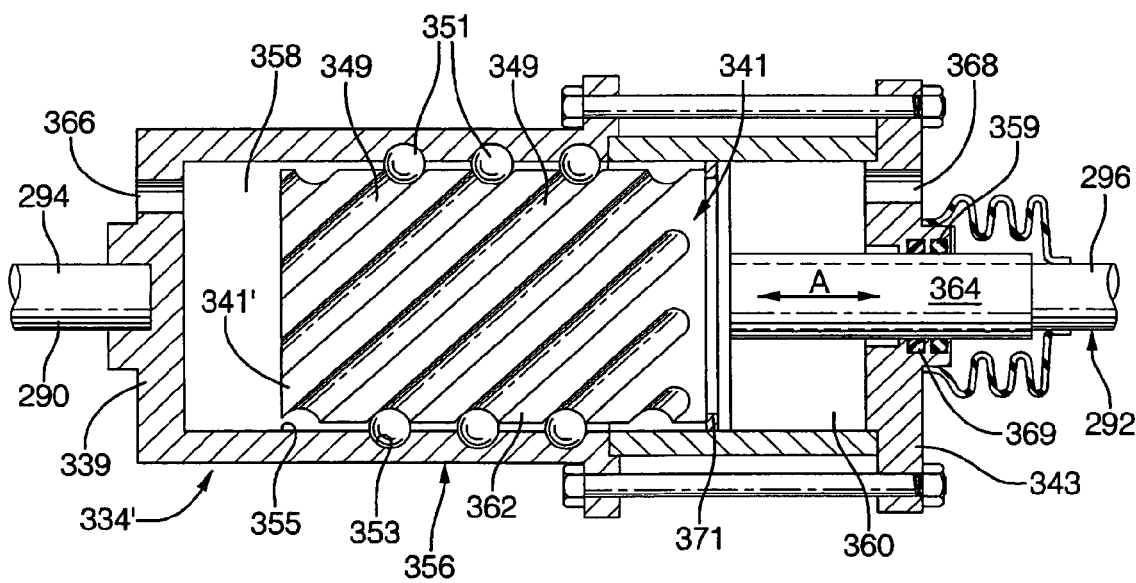
FIG. 13 is a cross-sectional view of a further alternative embodiment of hydraulic actuator for the vehicle roll control system of FIG. 10.
Figure 14:
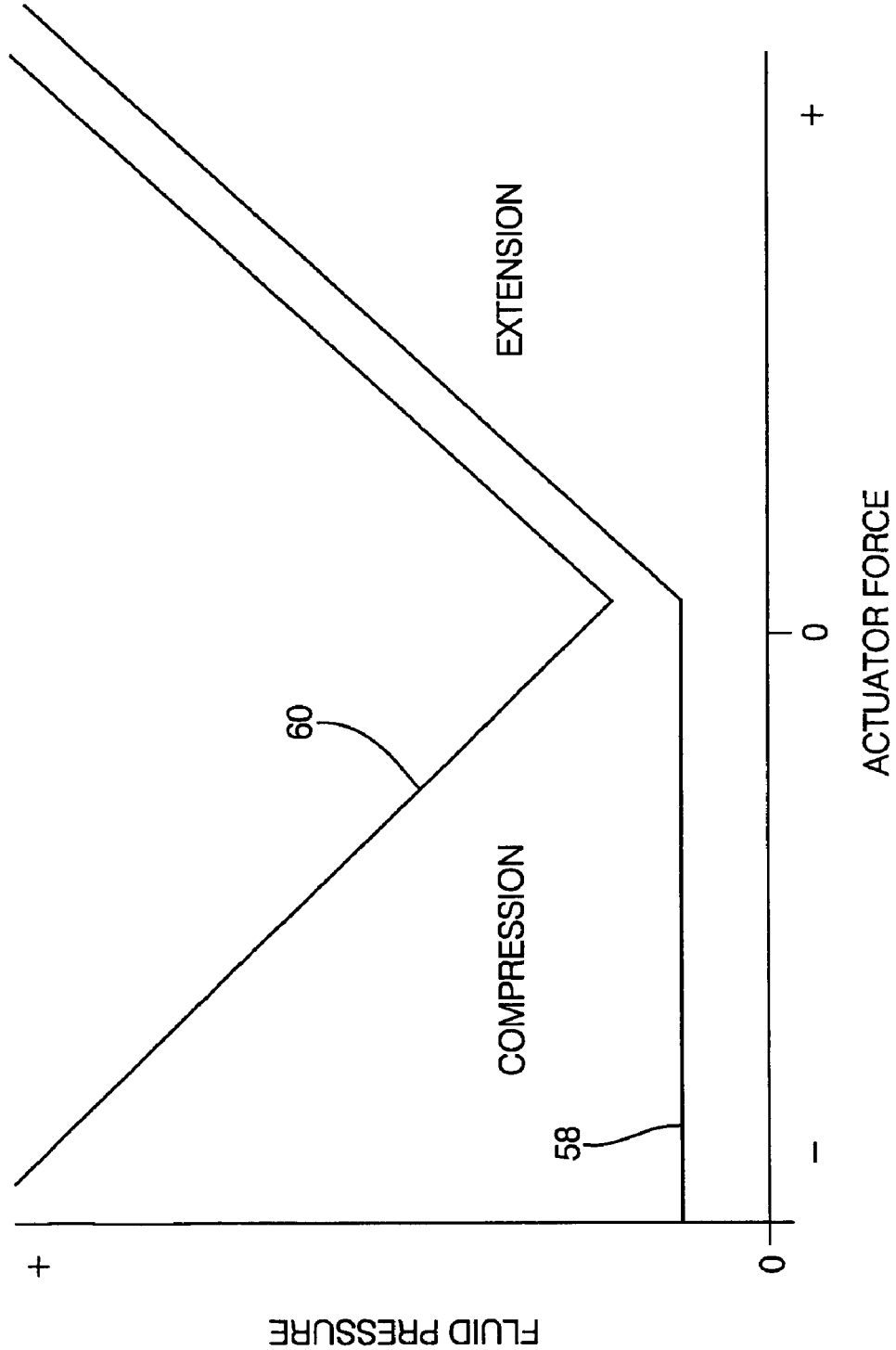
FIG. 14 is a graph of fluid pressure versus actuator force.
Figure 15:
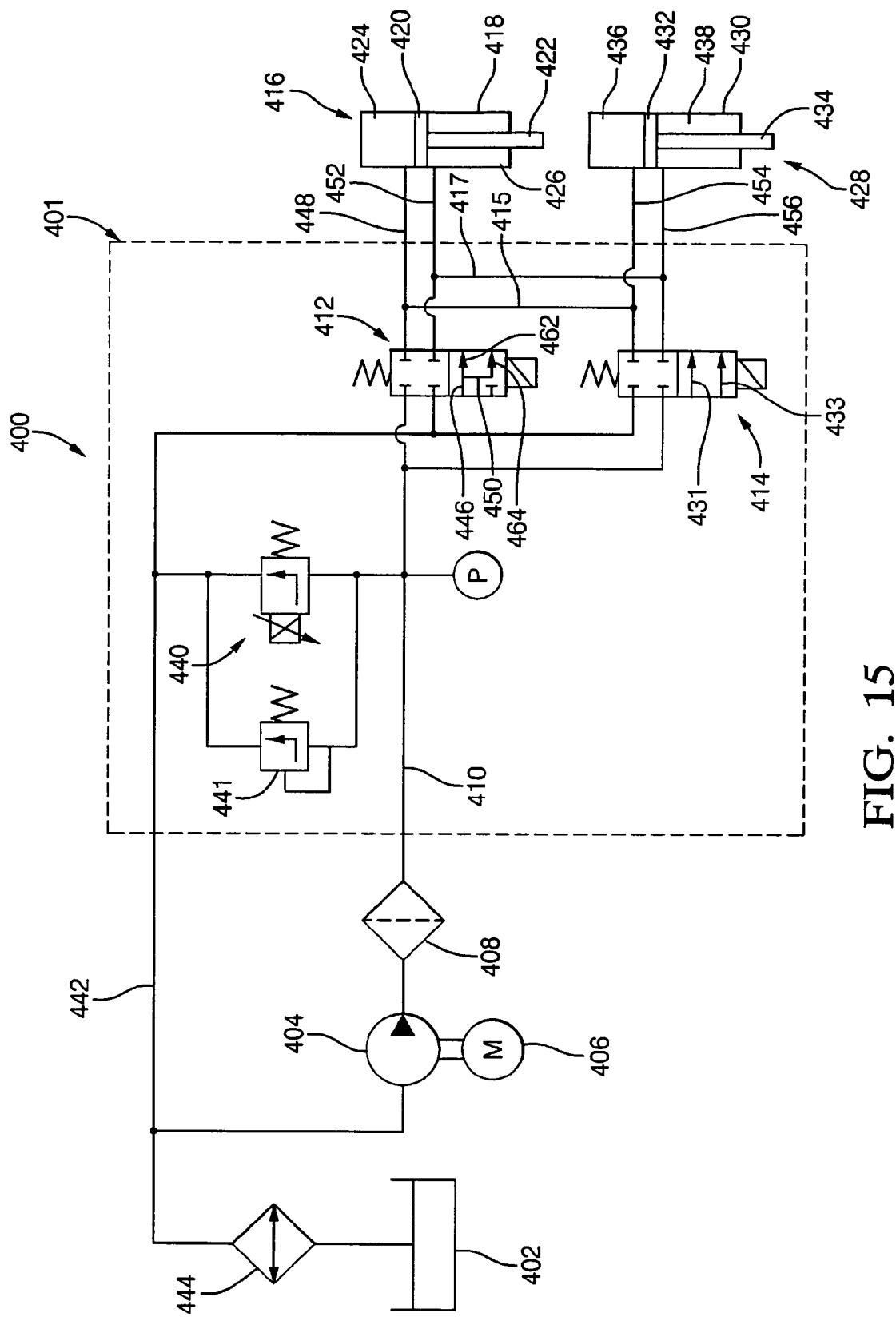

FIG. 15 shows a hydraulic system for use with a stabilizer bar system, anti-roll bar system, sway bar system, or vehicle roll control system including, but not limited to, such systems shown in FIGS. 1-4 and 9-13 and described above. The system 400 has a fluid reservoir 402 in fluid communication with a pump or pressure source 404, which may be driven by the vehicle engine or a motor 406. The pump 404 may be configured to run continuously while the vehicle is operated, or may be configured to run upon demand. Fluid exiting the pump 404 passes through an optional filter 408 and into a pressure line 410. The pressure line 410 (which can also be considered a pressure source or part of the pressure source) is in fluid communication with a pair of direction control valves (DCV-G valve 412 and DCV-B valve or auxiliary valve 414). As will be discussed in greater detail below, the output of the valves 412, 414 are coupled via connection lines 415, 417.

The hydraulic system 400 includes a front actuator 416 which includes a front actuator cylinder or outer casing 418. The cylinder 418 slidably yet sealingly receiving a front actuator piston 420 therein. The front actuator piston 420 is connected to a front actuator rod 422 and divides the front actuator cylinder 418 into a piston chamber 424 and a rod chamber 426. The front actuator 416 is fluidly coupled to both of the valves 412, 414.

The hydraulic system 400 further includes an auxiliary or rear actuator 428 including a rear or auxiliary actuator cylinder 430. The cylinder 430 slidably yet sealingly receives a rear or auxiliary actuator piston 432 therein. The rear actuator piston 432 is connected to a rear actuator rod 434 and divides the rear actuator cylinder 430 into a rear or auxiliary piston chamber 436 and a rear or auxiliary rod chamber 438. The rear actuator 428 is fluidly coupled to both of the valves 412, 414. Both of the direction control valves 412, 414 are biased (by a spring or otherwise) in the closed, non-energized or non-activated position. Thus, in the absence of any electromagnetic forces the valves 412, 414 are in their closed positions as shown in FIG. 15, in which case fluid is generally blocked from flowing therethrough.

The system 400 further includes a pressure control valve (PCV) 440 which is biased into an open position such that the valve 400 allows hydraulic fluid to flow therethrough. The PCV valve 440 is a variable valve such that, when moved into its closed position, the orifice size can be controlled to provide varying amounts of back pressure into the hydraulic system 400. In other words, the PCV valve 440 can be moved to various partially open or partially closed positions. A blow-off valve 441 is arranged in parallel with the PCV valve 440. The system 400 includes a return line 442 which routes fluid from the DCV-G valve 412, DCV-B valve 414 and PCV valve 440 to the reservoir 402 (via an optional cooler 444) and/or to the pump 404.

The configuration of the system 400 may be reversed such that DCV-G valve 412 is directly connected to the rear actuator 428 and the DCV-B valve 414 is directly to the front actuator 416. The various valves 412, 414, 440 and fluid connections together form a hydraulic control unit ("HCU") or hydraulic control module ("HCM") 401 defined by the dotted line rectangle in FIG. 15. The system of FIG. 15 (as well as the system of FIGS. 15A, 15B, 17, 21 and 22) may include a control module 70 and sensors 72, 74, 76, 77, 78 in the same or similar manner to the systems shown in FIGS. 5-8.

When it is desired to operate the stabilizer bar system or other control system such as the systems shown in FIGS. 1-4 and 9-13 (i.e. when the vehicle control system detects sufficiently hard cornering), the PCV valve 440 is closed to allow pressure to build in the system 400. Next, either the DCV-G valve 412 or DCV-B valve 414 is actuated (i.e., moved to its open position) to control and cause movement of the stabilizer bar or other control component.

Figure 15A:
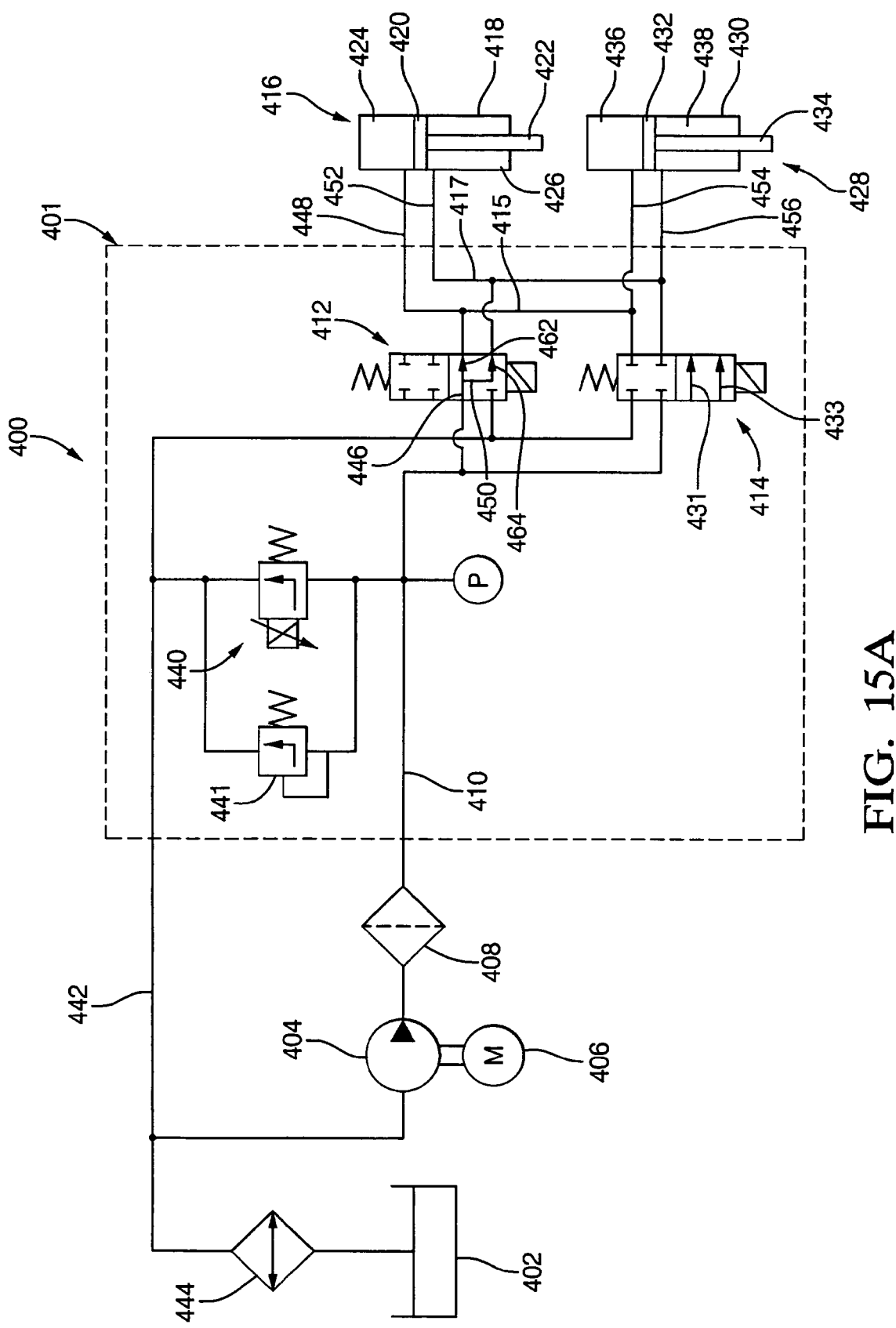
FIG. 15A is a schematic representation of the hydraulic circuit of FIG. 15, with one of the direction control valves in actuated position.

In particular, when it is desired to move the stabilizer bar, control component or actuator 416, 428 in a first direction (i.e., extension), the DCV-G valve 412 is moved to its open position while the DCV-B valve 414 remains closed. Thus, the DCV-G valve 412 moved up from its position shown in FIG. 15 as shown in FIG. 15A. When the DCV-G valve 412 is moved to its open position, an input line 446 in the DCV-G valve 412 connects the pressure line 410 and an input line 448 via a piston chamber port 462. The input line 448 is in fluid communication with the piston chamber 424 of the front actuator 416. Thus, when the DCV-G valve 412 is opened, fluid flows from the pressure line 410 to the piston chamber 424 of the front actuator 416 via the input line 448 and piston chamber port 462.

At the same time, fluid flows from the pressure line 410 to an inlet line 452 via a rod chamber port 464. In this manner fluid flows into the rod chamber 426 of the front actuator 416 via the inlet line 452. Because the pressurized fluid located in the piston chamber 424 of the front actuator 416 acts upon a greater surface area of the piston 420 than the fluid in the rod chamber 426, the front actuator piston 420 and rod 422 move downwardly (in extension) from their positions shown in FIG. 15A. The front actuator rod 422 is operatively coupled to the front stabilizer bar or other control component to thereby cause the front stabilizer bar or other component to move in the desired direction.

The input line 448 connected to the piston chamber 424 of the front actuator 416 is fluidly coupled to an input line 454 of the piston chamber 436 of the rear actuator 428 via connection line 415. Similarly, the input line 452 of the rod chamber 426 of the front actuator 416 is fluidly coupled to an input line 456 of the rod chamber 438 of the rear actuator 428 via connection line 417. Accordingly, the rear actuator 428, rear actuator piston 432 and rear actuator rod 434 are, in the illustrated embodiment, moved in the same manner as corresponding components of the front actuator 416 to cause corresponding movement in the rear stabilizer bar or other control component.

Once it is desired to return the stabilizer bar or other control component to its original position, the PCV valve 440 is moved to its open position. Fluid is then evacuated out of the piston chambers 424, 436 and returns to the pump 404 and/or reservoir 402 via return line 442. At least one of the valves 412, 414 may be left in its actuated position to allow pressurized fluid caused by road inputs to flow therethrough so that the system can thereby easily accommodate such road inputs. When the DCV-G 412 valve is closed, the piston chamber port 462 and rod chamber port 464 are each fluidly isolated from the pressure line 410.

When it is desired to move the actuators 416, 428 and stabilizer bars/control component in a second direction opposite to the first direction (i.e., in compression), the PCV valve 440 is again closed to generate the desired pressure in the system. The DCV-B valve 414 is then energized, actuated or moved to its open position (FIG. 15B) while the DCB-G valve 412 is moved to its closed position. The opened DCV-B valve 414 connects the internal port 433 of DCV-B valve 414 to the pressure line 410 and to the input line 456 of the rod chamber 438. The internal port 431 of DCV-B valve 414 is fluidly coupled to the return line 442 and input line 454. Placing the valves 440, 412, 414 in the configuration shown in FIG. 15B causes fluid to flow from the pressure line 410 to the rod chamber 438 of the rear actuator 428 via the input line 456. The increase is presssure in the rod chamber 438 causes the piston 432 to be moved up (in compression) from its position shown in FIG. 15B. The front piston 420 is also moved upwardly in the same manner as the rear piston 432 due to fluid flowing through the connection line 417 and into the front actuator rod chamber 426 via fluid line 452.

Once it is desired to move the stabilizer bars or other components to their original positions, the PCV valve 440 is returned to its open position. Fluid is then evacuated from the rod chambers 438, 426 and returns to the pump 404 and/or reservoir 402 via the return line 442.

Figure 15B:
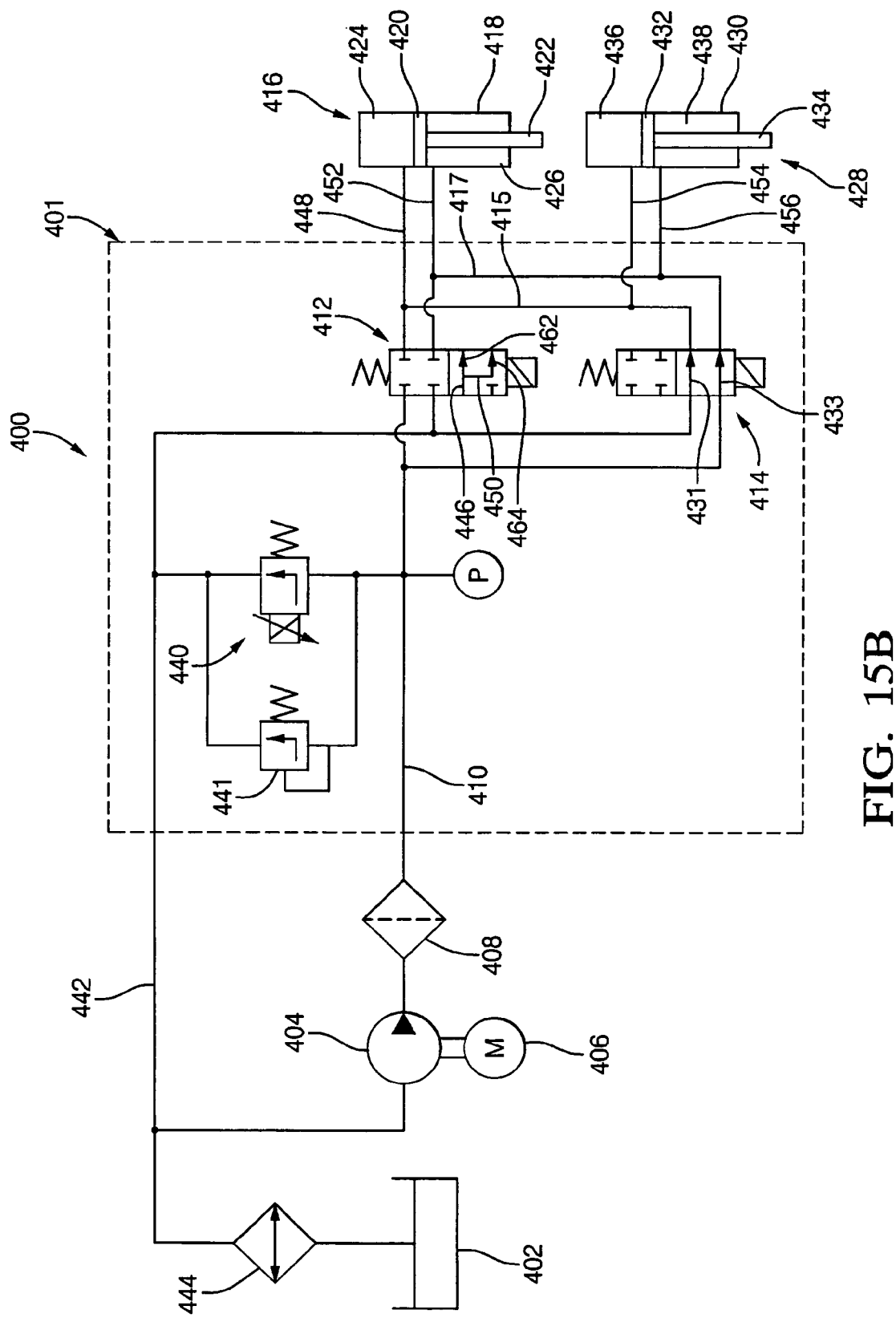
FIG. 15B is a schematic representation of the hydraulic system of FIG. 15 with the other one of the direction control valves in actuated position.
Figure 15C:
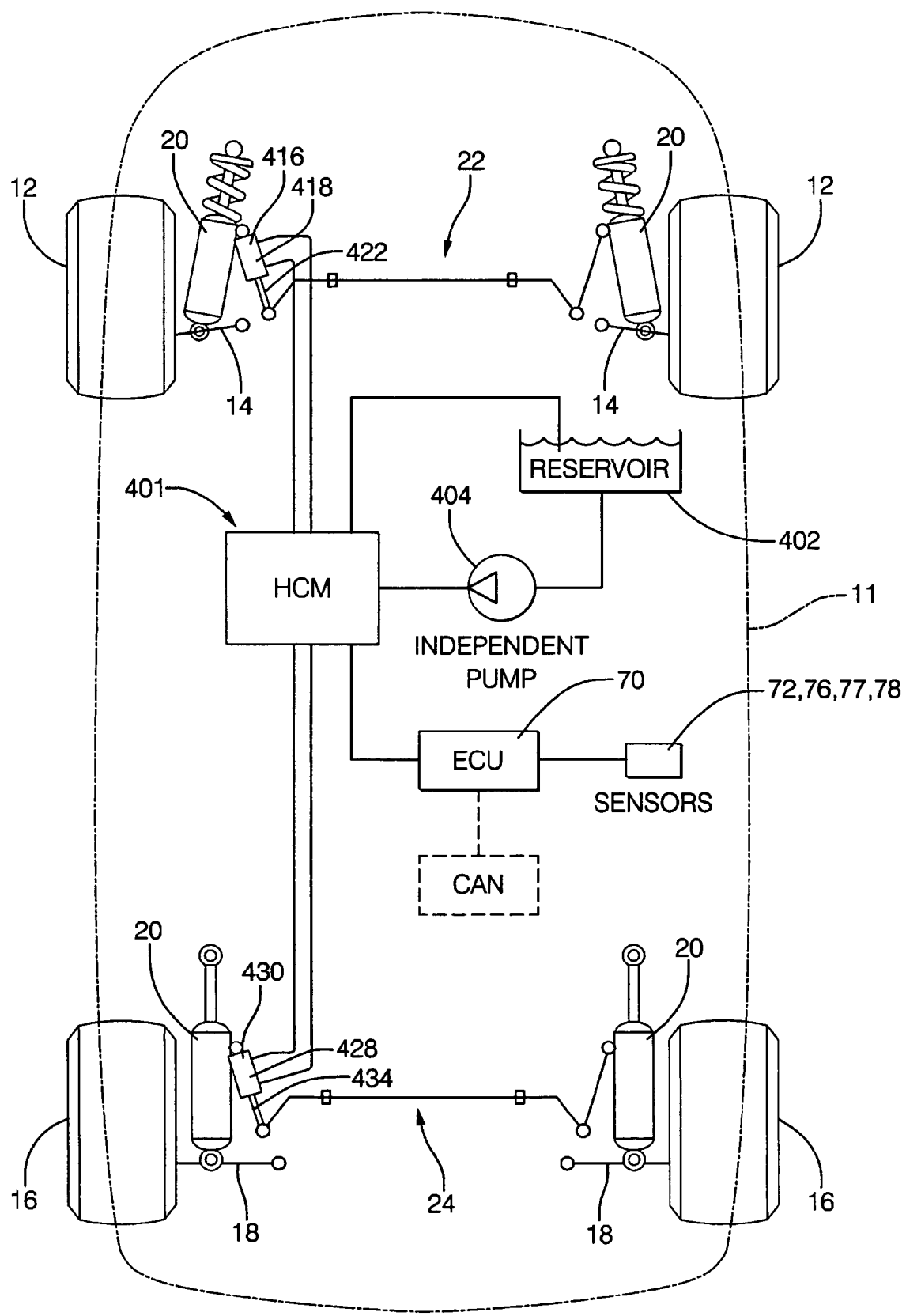
FIG. 15C is a schematic representation of a vehicle utilizing the system of FIG. 15.

FIG. 15C is a schematic representation of a vehicle 10 which includes or incorporates the hydraulic system 400 of FIG. 15.

FIG. 16 illustrates a valve spool 460 which may be utilized inside of or as part of the DCV-G valve 412 of FIG. 15. In particular, when the valve spool 460 is slidably received in a valve casing such that the valve spool 460 can move in the longitudinal direction B. The valve spool 460 includes an inner cavity 463, the pump port 462 and a rod port 464. The valve spool 460 includes the input port line 446 of the DCV-G valve 412 at its distal end thereof. As noted above, pump port 462 routes fluid from the pressure line 410 to input line 448 (and ultimately piston chambers 424, 436) when the DCV-G valve 412 is actuated. The rod port 464 routes fluid from pressure line 410 to input line 452 (and ultimately rod chambers 426, 438) when the DCV-G valve 412 is actuated.

When utilizing the system shown in FIG. 15 under normal driving conditions (i.e., not during heavy cornering), the PCV valve 440 is in its open position and one of the DCV-G or DCV-B valves 412, 414 is open. In particular, the DCV-G valve 412 may remain opened (FIG. 15A) to allow the stabilizer bars or other control components to move and to accommodate inputs from the road as the suspension system operates normally. However, in such a "normal" driving condition, when the vehicle passes over a large pothole or other similar road condition, the associated wheel may drop down quickly, thereby moving the pistons 420, 432 in a rapid manner (i.e. moving the pistons 420, 432 downwardly from their positions shown in FIG. 15). Because the pump 404 and system 400 may not have enough flow capacity to fill the piston chambers 424, 436 when the pistons 420, 432 are moved downwardly very rapidly in this manner, cavitation and aeration of the fluid in the piston chamber 424, 436 may result.

Once the cause of the rapid movement of the pistons 430, 436 is rectified or removed (i.e., the wheel is no longer above or in the pothole and returns to the flat road surface), the pistons 420, 432 move upwardly. This upward movement of the pistons 420, 432 first compresses the aeration bubbles in the pistons chambers 424, 436 back into the fluid, which provides a relatively small resistance to movement and allows the pistons 420, 432 to move up in a rapid manner. After the aeration is recompressed into the fluid, the pistons 420, 432 then fully engage the fluid, which provides a significantly increased resistance to movement of the pistons 420, 432. This discontinuity in force causes a large deceleration of the pistons 420, 432 (i.e., similar to smacking a flat piece of metal on the top surface of a volume of fluid) resulting in noise transmission in the vehicle and increased wear upon the pistons 420, 432, cylinders 418, 430 and other associated components.

In addition, when the pistons 420, 432 are urged in extension and then compression in a rapid manner, the momentum of the fluid being pushed by the pistons 420, 432 may cause the fluid to pull away from the pistons 420, 432 when the pistons 420, 432 stop or suddenly change direction, which causes cavitation in the rod chambers 426, 438. The cavitated fluid in the rod chambers 426, 438 can enter the fluid circuit and pump 404 and cause undesired effects. A measurement of pressure in the piston chambers 424, 436 shows a sharp non-linear or step-function pressure spike due to these effects of cavitation.

Figure 17:
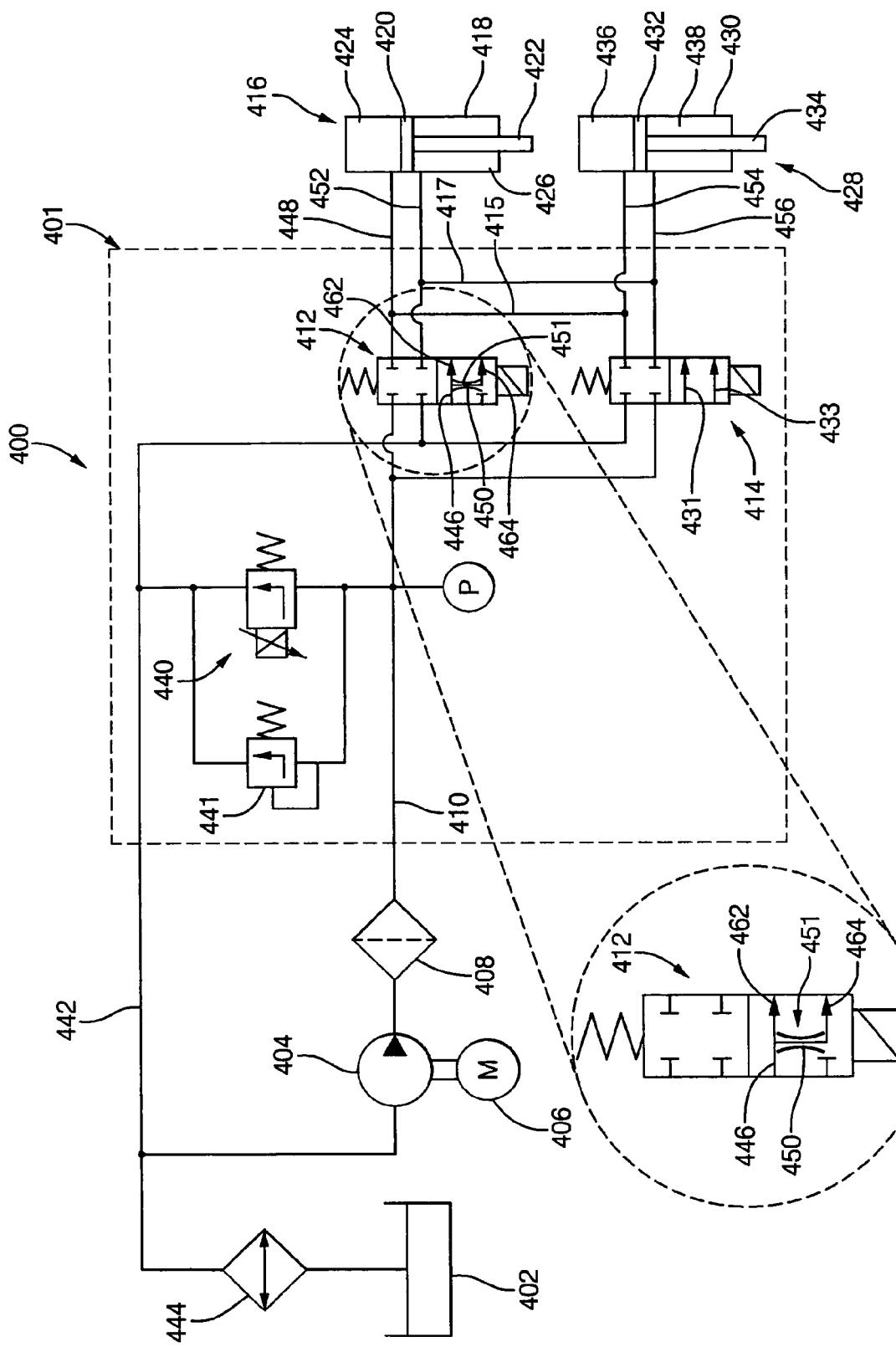
FIG. 17 is a schematic representation of a hydraulic circuit of one embodiment of the present invention.

FIG. 17 illustrates a system which is configured and operates in generally the same manner as the system of FIGS. 15, 15A and 15B, with the exception that the connection line 450 leading to the rod port 464 includes a restricted orifice 451. In particular, the restricted orifice 451 in the connection line 450 may be restricted such that it has a cross sectional area that is less than the smallest cross sectional area of any of the lines connecting the input line 448 or piston chamber 424 to the pressure line 410 (i.e., the pump port 462) or of other lines in the system. The restricted orifice 451 may have a cross sectional area that is less than about one-half, or less than about one-quarter, or less than about one-eighth, or less than about one-sixteenth, of the smallest cross sectional area along the entire length of the lines connecting the input line 448 to the pressure line 410 (i.e., the cross section area of the pump port 462) or of other lines in the system, or of lines 431, 433 in the valve 414.

The restricted orifice 451 in the connection line 450 may be restricted such that it has a cross sectional area that is less than any cross sectional area of the connections between the actuators 416, 428; that is line 415 and the portions of lines 448, 454 connecting the two pistons chambers 424, 436; and line 417 and the portions of lines 452, 456 connecting the two rod chambers 426, 438. The restricted orifice 450 may have a cross sectional area that is less than about one-half, or less than about one-quarter, or less than about one-eighth, or less than about one-sixteenth, of the smallest cross sectional area of the lines connecting actuators 416, 428.

The restricted orifice 451 may provide a total cross sectional area of less than about 10 mm$^2$, or less than about 5 mm$^2$, or less than about 3 mm$^2$, or less than about 1.5 mm$^2$, or less than about 1.3 mm$^2$.

The restricted orifice 451 of the connection line 450 or rod port 464 ensures that, under normal operating conditions when driving over a large pothole or the like, fluid that is forced out of the rod chambers 426, 438 must pass through the restricted orifice 451. Thus, the restricted orifice 451 prevents rapid evacuation of the rod chambers 426, 438. The restricted orifice 451 also forces a pressure drop to the actuator rod circuit, creating a path of lower resistance to the actuator piston chambers 424, 436, and thereby restricts fluid from returning to the supply side of the circuit and prevents rapid movement of the pistons 420, 432 downwardly under the conditions of interest. This, in turn, reduces cavitation in the piston 424, 436 and rod 426, 438 chambers, which improves noise performance and reduces loads imposed on the system. A measurement of pressure in the piston chambers 424, 436 shows a linear increase in pressure (rather than a sharp nonlinear or step-function) demonstrating that cavitation has been reduced.

The restricted connecting line 450 also provides additional benefits during normal operation of the hydraulic system 400. In particular, when the DCV-G valve 412 is moved to its open position while the PCV valve 440 is moved to its closed position (i.e., to operate the actuators 416, 428 in extension), fluid flows through the piston chamber port 462 and input lines 448, 454 to the piston chambers 424, 436 more freely than through the rod port 464, input lines 452, 456 and rod chambers 426, 438. This allows the pistons 420, 432 to move in extension in a more responsive manner, thereby providing a more responsive stabilizer bar/control system.

Various methods of forming the restricted orifice may be utilized. However, FIG. 18 illustrates one embodiment wherein the spool 460 of FIG. 16 has a sleeve 470 located on the inner cavity 463. The spool 460 has an inner orifice 472 defining the restricted orifice 451. The sleeve 470 is received in the spool 460 and located downstream of the pump port 462. However, the configuration shown in FIG. 18 may be undesirable because the large surface area presented at the axial end 474 of the sleeve 470 may cause the entire spool 460 to be axially moved when the DCV-G valve 412 is pressurized and can thus cause the spool 460 to close in an undesirable manner.

Figure 19:
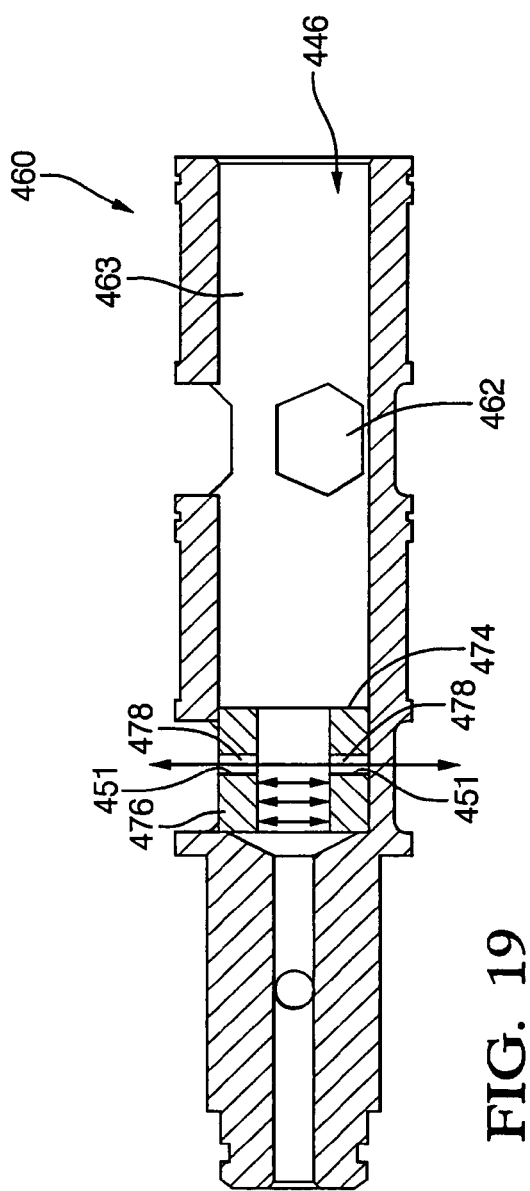
FIG. 19 is a side cross section of another spool for use in one of the direction control valves of FIG. 17.

The spool arrangement shown in FIG. 19 includes a spool 460 somewhat similar to that of FIG. 18, but the sleeve 476 is moved towards the axial end of the spool 460 and includes a pair of radially extending orifices 478 which provide the restricted flow to and from the rod chambers 426, 438 and define the restricted orifice 451. The sleeve 476 disclosed in FIG. 19 significantly reduces the surface area at the axial end 474 and reduces undesired closing of the spool 460 presented by the configuration shown in FIG. 18.

Figure 20:
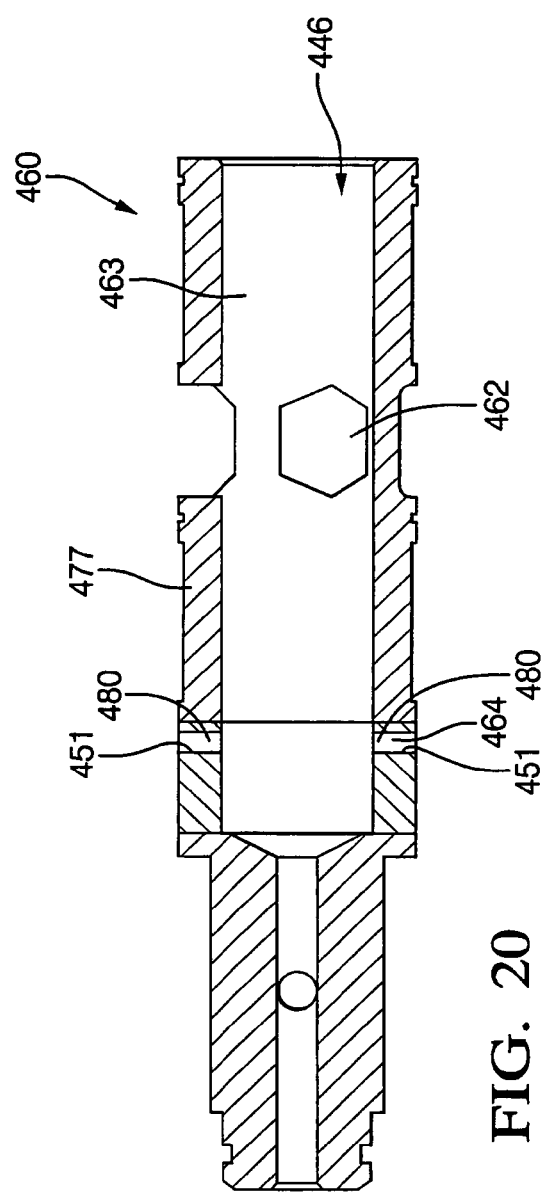
FIG. 20 is another side cross section of another spool for use in one of the direction control valves of FIG. 15.

The spool 460 shown in FIG. 20 is similar to that of FIG. 19, but illustrates a pair of radially extending restricted orifices 480 formed in the outer walls or body 477 of the spool 460 and defining the restricted orifice 451. In this case, the spool 460 eliminates the sleeve 476 and its axial end surfaces 474. The spool 460 has a body 477 and the piston chamber port 462, rod chamber port 464, and restricted orifice 480 are openings defined in the body 477 and communicate with the inner cavity 463.

Thus, the restricted orifice 451 reduces cavitation in the rod chambers 426, 438, and also directs pump flow to the piston chambers 428, 436. This allows the system to more quickly feed the piston chambers 424, 436 when the DCV-G valve 412 opens, and reduces the possibility of cavitation in the piston chambers 428, 436. In addition, the overall system 400 is not compromised, since low fluid flow (i.e., control flow when the actuators 416, 428 are not being extended or compressed) is not significantly impeded by the restricted orifice 451. Noise performance is improved, in that when the pistons 420, 432 are forced to extend by wheel input, the rod chamber fluid return path 450 is restricted to thereby slow initial movement of the pistons 420, 432 and prevent cavitation. If there is no cavitation in the rod chambers 426, 438 when the piston valves 412, 414 is open, the rod chamber 426, 438 can supply fluid (i.e. rather than air or cavitated fluid) to the piston chamber 424, 436 as needed.

Finally, as the piston 420 moves in compression, the restriction 451 encourages fluid to flow to the piston chamber 424. In particular, when fluid flows from the pressure line 410 and into the valve 412, due to the restricted orifice 451 fluid tends to flow more readily to input line 448 rather than input line 452. This sets up a condition of fluid inertia flowing through input line 448 to the piston chamber 424. Accordingly, when the piston 420 moves in rapid extension due to a road input, fluid that is evacuated out of the rod chamber 426 tends to flow into the piston chamber 424 due to fluid inertia, thereby reducing the chance of cavitation in the piston chamber 424.

The restricted orifice 451 can be formed by a single restricted opening (i.e. an opening having a diameter of about 1.3 mm with a tolerance of about +/−0.02 mm or less). Alternately, the restricted orifice 451 can be formed by a pair of openings (i.e. two openings each having a diameter of about 0.9 mm with a tolerance of about +/−0.02 mm or less). Further alternately, the restricted orifice 451 can comprise three or more openings, and the various openings can take a variety of shapes (such as radially-extending openings, etc.) Of course, the shape and size of the restricted orifice 451 can be varied to match the requirements of various systems and vehicles.

Figures 21, 22:
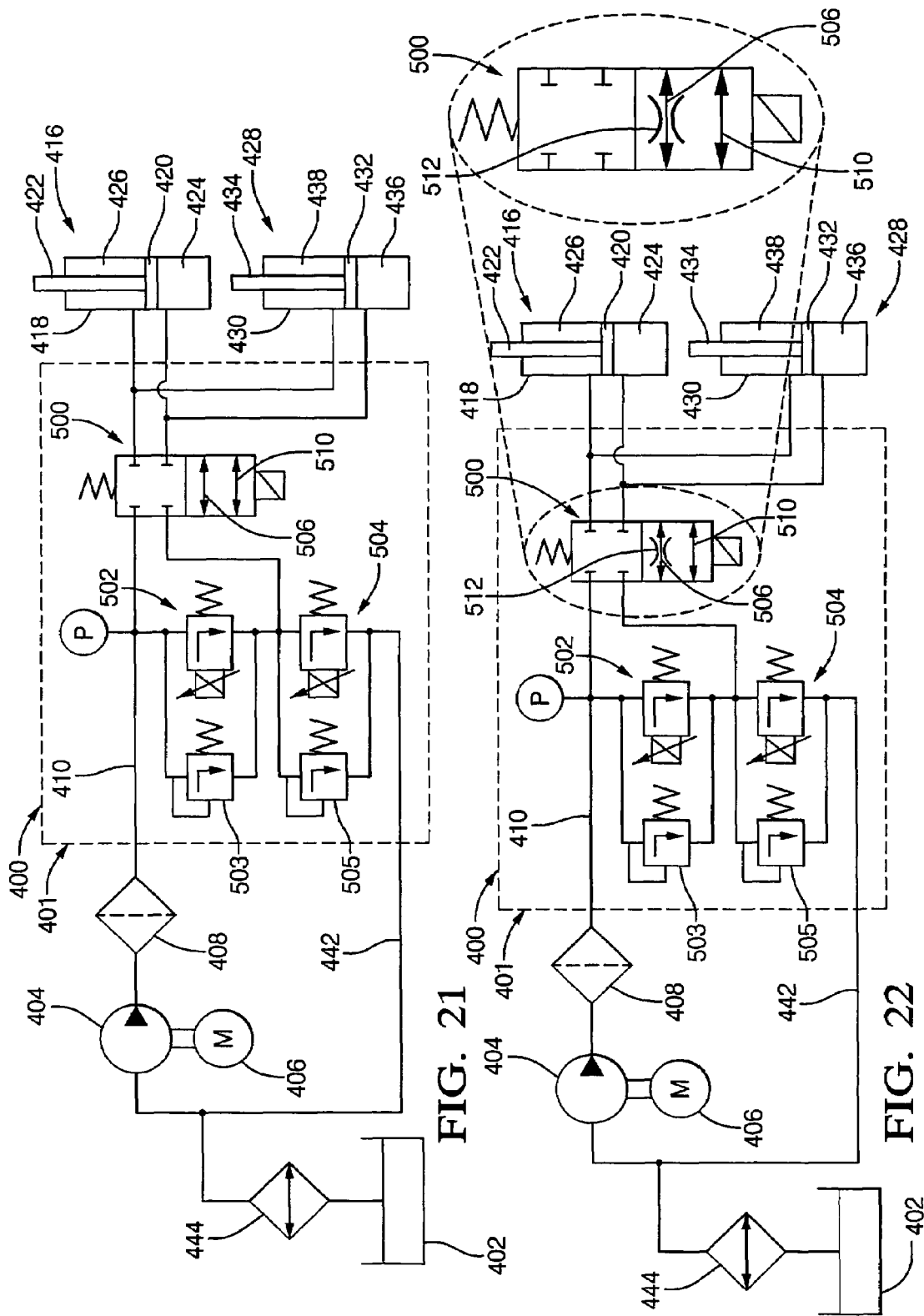
FIG. 21 is a schematic representation of a hydraulic circuit for use with a vehicle roll control system.
FIG. 22 is a schematic representation of a hydraulic circuit illustrating another embodiment of the present invention.

Referring now to FIG. 21, there is shown a single channel, dual PCV hydraulic system of the type that may be employed in the system of FIGS. 2-4 and 9-13. Analogous components to the systems of FIGS. 15A, 15B, and 17 are shown with the same reference numbers. The system of FIG. 21 includes a direction control valve (DCV-B) 500 and two pressure control valves 502, 504. Each of the pressure control valves 502, 504 has an associated pressure release or blow-out valve 503, 505, and are variable valves in that the valves 502, 504 can be moved to various partially open/partially closed position to set a desired backpressure.

In order to compress the actuators 416, 428, the direction control valve 500 is actuated or moved to its open position (the valve 500 is shown in FIG. 21 in its closed or de-energized position). Next the pressure control valve 502 is closed or partially closed to cause pressurized fluid to flow through line or rod chamber port 506 of the direction control valve 500. From the line 506 pressurized fluid flow into the rod chambers 426, 438 of the actuators 416, 428 and causes the pistons 420, 432 to move in compression (downwardly in FIG. 21).

In order to extend the actuators 416, 428, the direction control valve 500 is actuated or moved to its open position. Next the pressure control valve 504 is closed or partially closed (while pressure control valve 502 remains open or substantially open) to cause pressurized fluid to flow through lines 506 and line or piston chamber port 510 of the direction control valve 500. From the lines 506, 510 pressurized fluid flow into the rod chambers 426, 438 and piston chambers 424, 436 of the actuators 416, 428. The equal pressures on both sides of the pistons 420, 432 causes the pistons 420, 432 to move in extension (upwardly in FIG. 21). The lines 506, 510 are fluidly isolated from each other in the valve 500.

FIG. 22 depicts the modification to direction control valve 500 of the circuit shown in FIG. 21. In particular, the line or port 506 inside the valve 500, which when open is in fluid communication with the rod chambers 424, 436, includes a restricted orifice 512. This restriction 512 operates in generally the same manner and provides generally the same benefits as restriction 451 discussed above in the context of FIG. 17. Thus the restriction 510 significantly reduces the possibility cavitation in the actuators 416, 428, reduces acceleration spikes and reduces actuator noise or clunk. The hydraulic fluid restriction 512 provided by the present invention may be located between the fluid supply 402/404 and the actuators 416, 428, with there being no substantial hydraulic fluid restriction between the front 416 and rear 428 actuators.

Although the hydraulic restrictions provided by the embodiments of the present invention are shown as being used in the system of FIGS. 2-4 and 9-13, it should be understood that such a restriction may be used in nearly any active stabilizer bar or other control system.

Having described the invention in detail and by reference to the preferred embodiments, it will be apparent that modifications and variations thereof are possible without departing from the scope of the invention.

What is claimed is:

1. A hydraulic system for use in a motorized vehicle comprising:
    a pressure source;
    a valve fluidly coupled to the pressure source; and
    an actuator fluidly coupled to the valve and including an outer casing and a piston slidably received in the outer casing such that the piston defines a piston chamber and a rod chamber in the outer casing, the actuator including a rod coupled to the piston on a side of the piston facing the rod chamber, wherein the valve is configured such that when the valve is in an open position the valve provides fluid communication to the rod chamber and provides fluid communication to the piston chamber, wherein fluid flowing through the valve to the rod chamber passes through a restricted orifice having cross sectional area that is smaller than the cross sectional area of any orifice that would be passed through by fluid flowing through the valve to the piston chamber, wherein the valve includes a piston chamber port and a rod chamber port, and wherein the valve is configured such that when the valve is in the open position the pressure source is in fluid communication with the piston chamber via the piston chamber port and the valve provides fluid communication with the rod chamber via the rod chamber port, wherein when the rod chamber port has a smaller cross sectional area than the piston chamber port to provide said restricted orifice.

2. The system of claim 1 wherein the valve is configured such that when the valve is in the open position the valve provides fluid communication between the pressure source and the rod chamber.

3. The system of claim 1 wherein the valve is configured such that when the valve is in the open position the valve provides fluid communication between the pressure source and the piston chamber.

4. The system of claim 1 wherein the piston chamber port and the rod chamber port are in fluid communication with each other inside the valve.

5. The system of claim 1 wherein the piston chamber port and rod chamber port are fluidly isolated from each other in the valve.

6. The system of claim 1 wherein the valve is movable between the open position and a closed position wherein rod chamber port and the piston chamber port are fluidly isolated from the pressure source.

7. The system of claim 6 wherein the valve is biased into the closed position in the absence of any electromagnetic forces.

8. The system of claim 1 wherein the valve includes a spool movably mounted in a valve casing, the spool having an outer body with an inner cavity formed therein, wherein the piston chamber port and the restricted orifice are openings defined in the body and communicating with the inner cavity.

9. The system of claim 1 further comprising an auxiliary actuator including an auxiliary outer casing and an auxiliary piston slidably received in the auxiliary outer casing such that the auxiliary piston defines an auxiliary piston chamber and an auxiliary rod chamber in the auxiliary outer casing, wherein the valve is configured such that when the valve is in the open position the valve provides fluid communication to the auxiliary rod chamber and provides fluid communication to the auxiliary piston chamber.

10. The system of claim 9 wherein said piston chamber of said actuator is in fluid communication with said auxiliary piston chamber, and wherein said rod chamber of said actuator is in fluid communication with said auxiliary rod chamber, and wherein the restricted orifice has cross sectional area that is smaller than the cross sectional area of any orifice that would be passed through by fluid flowing from the piston chamber to the auxiliary piston chamber, or from the rod chamber to the auxiliary rod chamber.

11. The system of claim 9 wherein the piston is operatively coupled to a stabilizer bar associated with the front or rear of a vehicle, and wherein the auxiliary piston is operatively coupled to a stabilizer bar associated with the other of the front or rear of the vehicle.

12. The system of claim 1 further comprising a return line in fluid communication with an inlet of the pressure source, wherein the system further includes an auxiliary valve having a piston chamber port and a rod chamber port configured such that when the auxiliary valve is in an open position the auxiliary valve provides fluid communication between the pressure source and the rod chamber and provides fluid communication between the return line and the piston chamber.

13. The system of claim 12 further comprising an auxiliary actuator including an auxiliary outer casing and an auxiliary piston slidably received in the auxiliary outer casing such that the auxiliary piston defines an auxiliary piston chamber and an auxiliary rod chamber in the auxiliary outer casing, wherein the auxiliary valve is configured such that when the auxiliary valve is in the open position the auxiliary valve provides fluid communication between the pressure source and the auxiliary rod chamber and provides fluid communication between the return line and the auxiliary piston chamber.

14. The system of claim 1 further comprising a pressure control valve operatively coupled to the pressure source, wherein the pressure control valve is operable to control the pressure of fluid provided to the valve.

15. The system of claim 1 wherein the pressure source includes a pump.

16. The system of claim 1 wherein the restricted orifice has cross sectional area that is less than one half the cross sectional area of the smallest orifice passed through by fluid flowing to the piston chamber via the valve.

17. The system of claim 1 wherein the restricted orifice has a cross sectional area of less than 5 mm$^2$.

18. The system of claim 1 wherein the restricted orifice has cross sectional area that is smaller than the cross sectional area of the smallest orifice passed through by fluid flowing from the valve to the piston chamber.

19. The system of claim 1 wherein the piston is operatively coupled to a stabilizer bar.

20. A hydraulic system for use in a motorized vehicle comprising:
- a pressure source;
- a valve fluidly coupled to the pressure source; and
- an actuator fluidly coupled to the valve and including an outer casing and a piston slidably received in the outer casing such that the piston defines a piston chamber and a rod chamber in the outer casing, the actuator including a rod coupled to the piston on a side of the piston facing the rod chamber, wherein the valve is configured such that when the valve is in an open position the valve provides fluid communication to the rod chamber and provides fluid communication to the piston chamber, wherein fluid flowing through the valve to the rod chamber passes through a restricted orifice having cross sectional area that is smaller than the cross sectional area of any orifice that would be passed through by fluid flowing through the valve to the piston chamber wherein the piston is operatively coupled to a stabilizer bar.

21. The system of claim 20 wherein the piston is operatively coupled to the stabilizer bar such that movement of the piston causes the stabilizer bar to exert upward or downward forces upon a wheel of a vehicle.

22. A hydraulic system for use in a motorized vehicle comprising:
- a pressure source;
- a valve fluidly coupled to the pressure source; and
- an actuator fluidly coupled to the valve and including an outer casing and a piston slidably received in the outer casing such that the piston defines a piston chamber and a rod chamber in the outer casing, the actuator including a rod coupled to the piston on a side of the piston facing the rod chamber, wherein the valve is configured such that when the valve is in an open position the valve provides fluid communication to the rod chamber and provides fluid communication to the piston chamber, wherein fluid flowing through the valve to the rod chamber passes through a restricted orifice having cross sectional area that is smaller than the cross sectional area of any orifice that would be passed through by fluid flowing through the valve to the piston chamber, the system further comprising a first pressure control valve and a second pressure control valve arranged in series and configured to control the pressure of fluid provided to the valve.

23. A hydraulic system for use in a motorized vehicle comprising:
- a pressure source;
- a valve coupled to the pressure source, the valve including a piston chamber port and a rod chamber port;
- an outer casing; and
- a piston slidably received in the outer casing such that the piston defines a piston chamber and a rod chamber in the outer casing, wherein the valve is configured such that when the valve is in an open position the pressure source is in fluid communication with the piston chamber via the piston chamber port and the valve provides fluid communication with the rod chamber via the rod chamber port, wherein when the valve includes a restricted orifice such that when the valve is in the open position fluid flowing to the rod chamber passes through the restricted orifice having a smaller cross sectional area than any orifice passed through by fluid flowing to the piston chamber.

24. The system of claim 23 further comprising a first pressure control valve and a second pressure control valve arranged in series and configured to control the pressure of fluid provided to the valve.

25. A motorized vehicle comprising:
- a vehicle frame;
- at least two wheels connected to the frame upon a common axle;
- a stabilizer bar for vertically moving at least one of the two wheels; and
- a hydraulic system operatively coupled to the stabilizer bar to control movement thereof, the hydraulic system including a pressure source, a valve fluidly coupled to the pressure source, and an actuator fluidly coupled to the valve and including an outer casing and a piston slidably received in the outer casing such that the piston defines a piston chamber and a rod chamber in the outer casing, the actuator including a rod coupled to the piston on a side of the piston facing the rod chamber and operatively coupled to the stabilizer bar, wherein the valve is configured such that when the valve is in an open position the valve provides fluid communication between the rod chamber and the pressure source and provides fluid communication to the piston chamber, wherein fluid flowing through the valve to the rod chamber passes through a restricted orifice having cross sectional area that is smaller than the cross sectional area of any orifice passed through by fluid flowing through the valve to the piston chamber, wherein the restricted orifice has cross sectional area that is less than one half the cross sectional area of the smallest orifice passed through by fluid flowing to the piston chamber via the valve.

26. The system of claim 25 further comprising a first pressure control valve and a second pressure control valve arranged in series and configured to control the pressure of fluid provided to the valve.

27. The system of claim 25 wherein the restricted orifice is positioned in said valve.

28. A hydraulic system for use in a motorized vehicle comprising:
- a fluid supply;
- a pressure source through which fluid is conveyed from the fluid supply;
- a pair of direction control valves, each direction control valve including a rod chamber port and a piston chamber port, the rod chamber ports of the direction control valves being in fluid communication with each other and the piston chamber ports of the direction control valves being in fluid communication with each other;
- a pressure control valve having an inlet that is in fluid communication with an inlet of the each of the direction control valves;
- a pair of outer casings; and
- a piston slidably received in each outer casing, wherein each piston defines a piston chamber and a rod chamber in the associated outer casing, wherein when one of the direction control valves is open the pressure source is in fluid communication with the rod cavities via the rod chamber port of the one of the direction control valves and the pressure source is in fluid communication with the piston cavities via the piston chamber port of the one of the direction control valves, wherein the fluid communication between the fluid supply and the outer casings via the one of the direction control valves is more restricted than the fluid communication between the piston chambers and between the rod chambers.

29. The system of claim 28 wherein said one of the direction control valves includes a restricted orifice therein such that the fluid communication between the fluid supply and the outer casings via the one of the direction control valves is more restricted than the fluid communication between the piston chambers and between the rod chambers.

30. A hydraulic system for use in a motorized vehicle comprising:
a fluid supply;
a pressure source through which fluid is conveyed from the fluid supply;
a first and a second pressure control valve, the first pressure control valve having an inlet in fluid communication with the pressure source and an outlet in fluid communication with an inlet of the second pressure control valve, wherein said first and second pressure control valves are variable valves that are directly controllable by a controller to set a desired backpressure;
a direction control valve in fluid communication with the outlet of the first pressure control valve and including a rod chamber port and a piston chamber port;
a pair of outer casings; and
a piston slidably received in each outer casing, wherein each piston defines a piston chamber and a rod chamber in the associated outer casing, wherein when the direction control valve is open the pressure source is in fluid communication with the rod cavities via the rod chamber port and the inlet of the second pressure control valve is in fluid communication with the piston cavities via the piston chamber port, wherein the fluid communication between the fluid supply and the outer casings is more restricted than the fluid communication between the outer casings.

31. The system of claim 30 wherein the direction control valve includes a restricted orifice therein such that fluid communication between the fluid supply and the outer casings is more restricted than the fluid communication between the outer casings.

32. The system of claim 30 wherein said first and second pressure control valves are arranged in series and configured to control the pressure of fluid provided to the valve.

* * * * *